(12) United States Patent
Watanabe et al.

(10) Patent No.: US 8,826,290 B2
(45) Date of Patent: Sep. 2, 2014

(54) METHOD OF MONITORING PERFORMANCE OF VIRTUAL COMPUTER AND APPARATUS USING THE METHOD

(75) Inventors: Kentaro Watanabe, Yokohama (JP); Yoshimasa Masuoka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 13/464,350

(22) Filed: May 4, 2012

(65) Prior Publication Data

US 2012/0222029 A1    Aug. 30, 2012

Related U.S. Application Data

(63) Continuation of application No. 11/857,820, filed on Sep. 19, 2007, now Pat. No. 8,191,069.

(30) Foreign Application Priority Data

May 22, 2007    (JP) ................................. 2007-135687

(51) Int. Cl.
*G06F 9/455*    (2006.01)
*G06F 9/46*    (2006.01)

(52) U.S. Cl.
USPC ............... 718/104; 718/1; 718/100; 718/102; 718/105

(58) Field of Classification Search
None
See application file for complete search history.

(56) References Cited

U.S. PATENT DOCUMENTS

| | | |
|---|---|---|
| 2003/0097393 A1 | 5/2003 | Kawamoto et al. |
| 2005/0081122 A1 | 4/2005 | Hiramatsu et al. |
| 2005/0132362 A1 | 6/2005 | Knauerhase et al. |
| 2005/0160423 A1 | 7/2005 | Bantz et al. |
| 2006/0143617 A1 | 6/2006 | Knauerhase et al. |
| 2006/0200821 A1 | 9/2006 | Cherkasova et al. |

FOREIGN PATENT DOCUMENTS

| | | |
|---|---|---|
| JP | 2003-157177 A | 5/2003 |
| JP | 2005-115751 A | 4/2005 |

OTHER PUBLICATIONS

Moreau et al. Resource Aware Programming. [online] (May 2005). ACM., pp. 441-476. Retrieved From the Internet <http://dl.acm.org/citation.cfm?id=1065891>.*

* cited by examiner

*Primary Examiner* — Emerson Puente
*Assistant Examiner* — Jonathan R Labud
(74) *Attorney, Agent, or Firm* — Mattingly & Malur, PC

(57) ABSTRACT

Provided are a method and an apparatus for monitoring performance of a virtual computer. In a method of controlling a computer system including a computer, the computer executes a virtualization program for causing logically divided resources of the computer to operate as first and second virtual computers, the first virtual computer executes a first OS, and the second virtual computer executes a second OS. In the method, information regarding the resources allocated to the first virtual computer and the second virtual computer by the virtualization program is obtained from the virtualization program, information indicating performance of the first virtual computer is obtained from the first OS, information indicating performance of the second virtual computer is obtained from the second OS, the obtained information and information indicating a time of obtainment of the information are stored in a storage system, and stored information is output.

9 Claims, 22 Drawing Sheets

VIRTUAL COMPUTER GUEST OS CORRESPONDENCE TABLE

PERFORMANCE MONITORING AGENT GUEST OS CORRESPONDENCE TABLE

MONITORING INFORMATION TABLE

300

| | 300a | 300b | 300c | 300d | 300e |
|---|---|---|---|---|---|
| | TIME | VIRTUAL COMPUTER NAME | RESOURCE NAME | MONITORING INFORMATION NAME | MONITORING INFORMATION VALUE |
| | 2007/01/11 10:00:00 | VM1 | vCPU 1 | VIRTUAL CPU ALLOCATION RATE | 30 % |
| | 2007/01/11 10:00:00 | VM2 | vCPU 1 | VIRTUAL CPU ALLOCATION RATE | 20 % |
| | 2007/01/11 10:00:00 | VM2 | vCPU 2 | VIRTUAL CPU ALLOCATION RATE | 20 % |
| | ... | ... | ... | ... | ... |

FIG. 3C

GUEST PERFORMANCE INFORMATION TABLE

440

| | 440a | 440b | 440c | 440d | 440e |
|---|---|---|---|---|---|
| | TIME | HOST NAME | RESOURCE NAME | MONITORING INFORMATION NAME | MONITORING INFORMATION VALUE |
| | 2007/01/11 10:00:00 | GUEST OS 1 | vCPU 1 | VIRTUAL CPU USAGE RATE | 30 % |
| | 2007/01/11 10:00:10 | GUEST OS 1 | vCPU 1 | VIRTUAL CPU USAGE RATE | 10 % |
| | 2007/01/11 10:00:20 | GUEST OS 1 | vCPU 1 | VIRTUAL CPU USAGE RATE | 50 % |
| | ... | ... | ... | ... | ... |

FIG. 3D

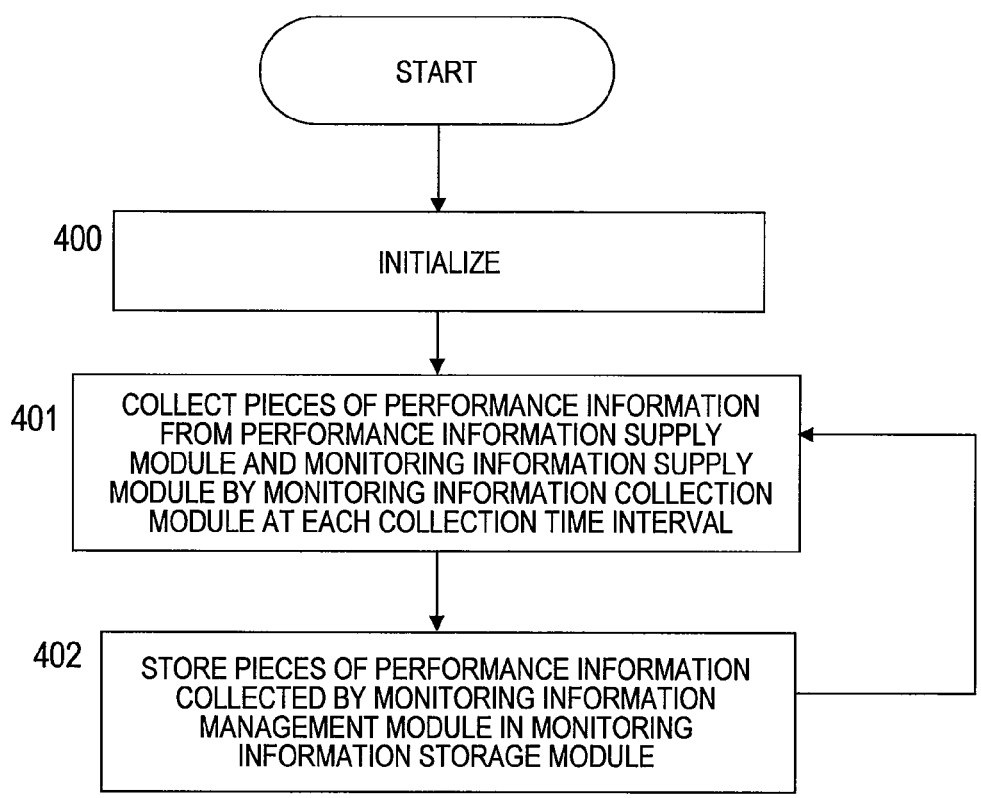

THRESHOLD VALUE TABLE

| NUMBER | VIRTUAL COMPUTER NAME | RESOURCE NAME | JUDGMENT CONDITION |
|---|---|---|---|
| 1 | VM1 | vCPU1 | CPU ALLOCATION RATE > 80% |
| 2 | VM2 | vCPU1 | CPU ALLOCATION REQUEST RATE > 5% |
| 3 | VM2 | vCPU2 | CPU ALLOCATION RATE = CPU ALLOCATION UPPER LIMIT VALUE |
| 4 | ... | ... | ... |

*FIG. 8*

LOAD JUDGMENT HISTORY TABLE

| TIME (2000a) | LOAD JUDGMENT RESULT (2000b) | | |
|---|---|---|---|
| | 1 | 2 | ... |
| 2007/01/10 10:00:00 | Y | N | ... |
| 2007/01/10 10:00:10 | Y | N | ... |
| 2007/01/10 10:00:20 | Y | N | ... |
| ... | ... | ... | ... |

ALTERNATIVE CONDITION TABLE (2001)

| ALTERNATIVE CONDITION (2001a) |
|---|
| (NUMBER = 1) && (CONDITION = WHEN THRESHOLD VALUE IS EXCEEDED 8 TIMES OUT OF 10) |
| (NUMBER = 2) && (CONDITION = WHEN THRESHOLD VALUE IS EXCEEDED 5 TIMES OUT OF 7) |
| ... |

FIG. 10B

METHOD OF MONITORING PERFORMANCE OF VIRTUAL COMPUTER AND APPARATUS USING THE METHOD

The present application is a continuation of U.S. patent application Ser. No. 11/857,820, filed Sep. 19, 2007, which claims priority from Japanese application JP2007-135687 filed on May 22, 2007, the content of which is hereby incorporated by reference into this application.

BACKGROUND

A technology disclosed herein belongs to a technology of monitoring performance of an information processing system. For example, the technology disclosed herein relates to a technology of monitoring performance of an operating system and an application operated in a virtual computer which operates in a monitoring target computer and to which dynamic resources are allocated from the monitoring target computer.

In the information processing system, when a load increases, throughput of the operating system (OS) and an application program decreases.

Some types are available for monitoring the information processing system. For example, monitoring is carried out by obtaining and displaying current performance information of the information processing system in real time to investigate a current status of the information processing system, and by storing performance information as history information in a storage system and investigating past performance information. Alternatively, monitoring is carried out by, for example, executing an action of generating an alert or sending mail to a manager when pieces of performance information obtained at a certain time interval are compared with a set threshold value, and the obtained pieces of performance information exceed the threshold value.

By monitoring the performance of the information processing system, a failure of the information processing system can be detected, and how to deal with the failure can be decided.

Recently, a technology of virtualizing a computer has come into wide use in the field of the information processing system. According to this technology, for example, by logically dividing resources of a physical computer, one physical computer can be used as a plurality of virtual computers. JP 2005-115751 A discloses a technology of monitoring performance when one computer is divided into a plurality of virtual computers and an OS is operated in each virtual computer. JP 2003-157177 A discloses a technology of optimizing allocation of computer resources to logical partitions (LPAR) based on a load of an OS in each LPAR of a virtual computer system and setting information based on knowledge of a work load operated in each OS.

SUMMARY

In the virtual computer, some of resources of a monitoring target computer are allocated as resources of the virtual computer. Allocated resources may dynamically fluctuate depending on loads of the virtual computer. Thus, by monitoring only performance information regarding a single guest OS, performance of the virtual computer cannot be monitored. When setting of a virtualization mechanism is changed, there is a fear in that the setting change may affect the other virtual computer which shares resources of a host with the virtual computer concerning the setting change. As a result, by monitoring only the performance information regarding a single guest OS, an effective dealing method cannot be decided.

An object of this invention is to provide a method and an apparatus for monitoring performance of a virtual computer capable of solving the problems of the conventional art.

According to a representative invention disclosed in this application, there is provided a method of controlling a computer system including a computer equipped with: a processor for executing a virtualization program for logically dividing resources including the processor of the computer and causing the divided resources to operate as a first virtual computer and a second virtual computer independent of each other; and a storage device coupled to the processor, the first virtual computer executing a first guest operating system, and the second virtual computer executing a second guest operating system, the method comprising: a first step of obtaining information regarding the resources allocated to the first virtual computer and the second virtual computer by the virtualization program from the virtualization program; a second step of obtaining information indicating performance of the first virtual computer from the first guest operating system; a third step of obtaining information indicating performance of the second virtual computer from the second guest operating system; a fourth step of storing the information regarding the allocated resources, information indicating a time of obtainment of the information regarding the allocated resources, the information indicating the performance, and information indicating a time of obtainment of the information indicating the performance in the storage device; and a fifth step of outputting the information indicating the time, the information regarding the allocated resources obtained at the time, and the information indicating the performance obtained at the time.

According to this invention, performance information managed in a guest OS can be correlated with resource allocation information. Thus, even when allocated resources of the virtual computer dynamically fluctuate, an effective dealing method can be decided by monitoring performance of the virtual computer.

BRIEF DESCRIPTION OF THE DRAWINGS

FIG. 3C shows a monitoring information table according to the first embodiment of this invention.

FIG. 3D shows a guest performance information table according to the first embodiment of this invention.

FIG. 3E shows a management table according to the first embodiment of this invention.

FIG. 4A is a flowchart showing a process of collecting pieces of performance information by a performance monitoring agent according to the first embodiment of this invention.

FIG. 8 is an explanatory diagram of a threshold value table according to the fourth embodiment of this invention.

FIG. 10A is an explanatory diagram of a load judgment history table according to a fifth embodiment of this invention.

FIG. 10B is an explanatory diagram of an alternative condition table according to the fifth embodiment of this invention.

DETAILED DESCRIPTION OF THE PREFERRED EMBODIMENTS

Figure 1:
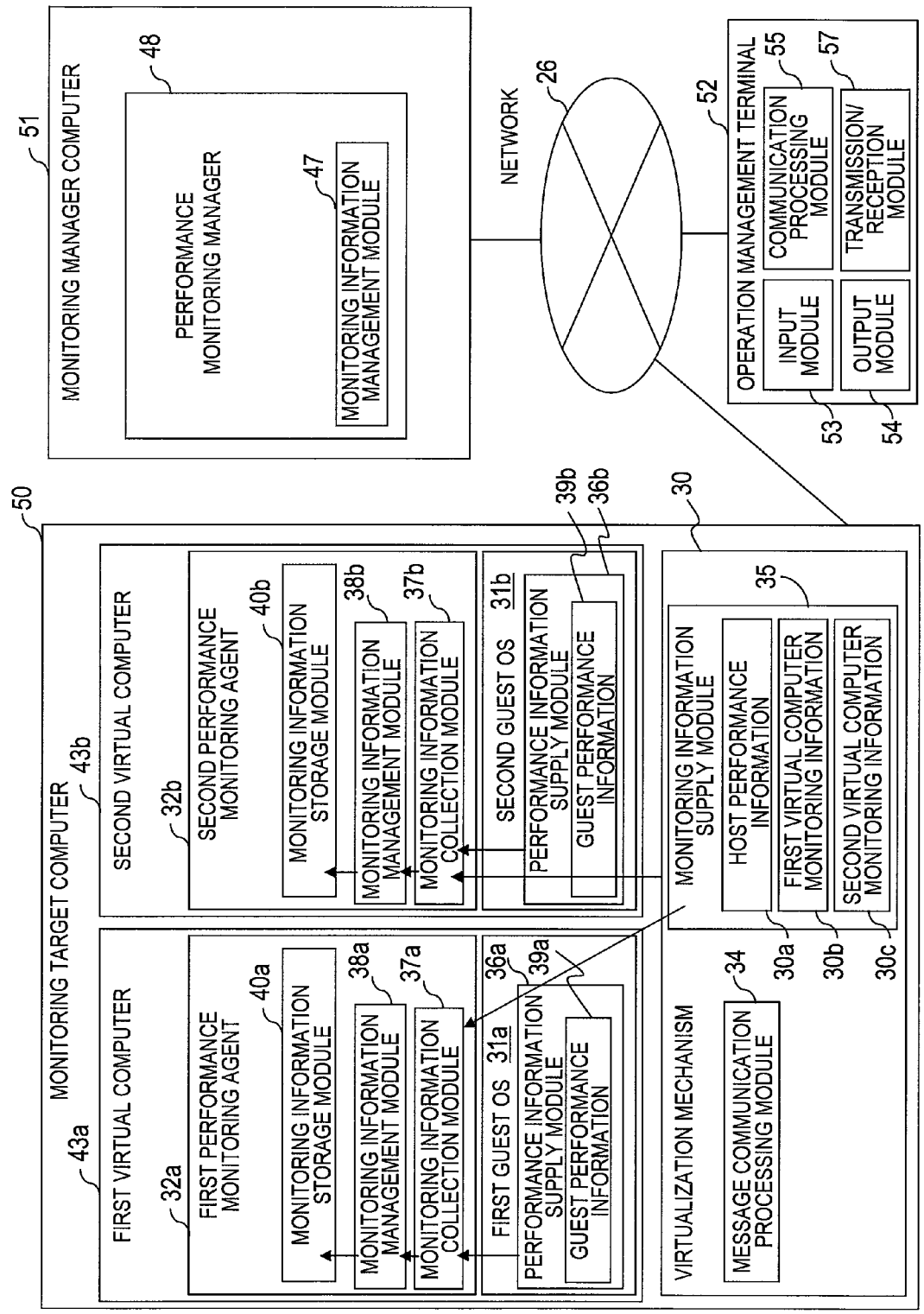
FIG. 1 is a functional block diagram showing a configuration of an information processing system according to a first embodiment of this invention.

Referring to the drawings, the embodiments of the information processing system of this invention will be described below in detail.

FIG. 1 is a functional block diagram showing a configuration of an information processing system according to a first embodiment of this invention.

The information processing system of the first embodiment of this invention is realized by a computer system which includes a monitoring target computer 50, a monitoring manager computer 51, and an operation management terminal 52. The monitoring target computer 50, the monitoring manager computer 51, and the operation management terminal 52 are interconnected via a network 26.

According to this embodiment, an operator of the information processing system monitors performance of a virtual computer operated in the monitoring target computer 50 through the operation management terminal 52.

The management target computer 50 includes a virtualization mechanism 30.

Figure 2:
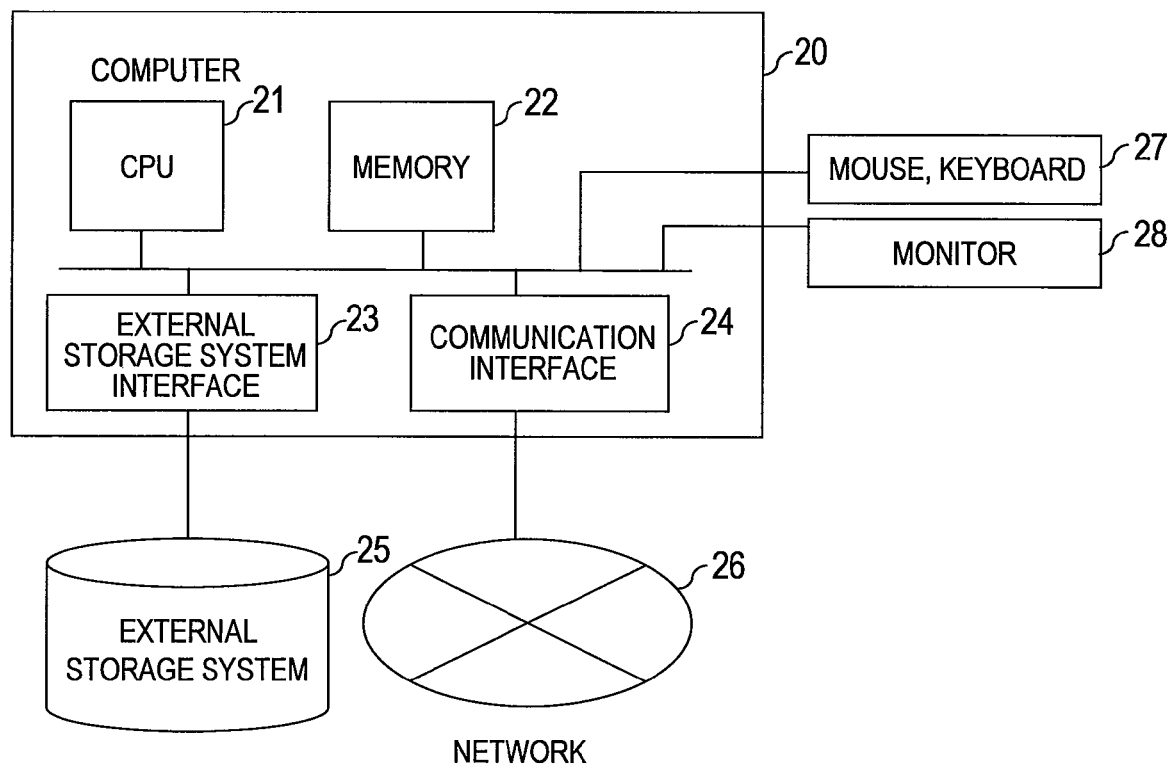
FIG. 2 is a block diagram showing a hardware configuration of a monitoring target computer according to the first embodiment of this invention.

The virtualization mechanism 30 is software executed by a CPU 21 of the monitoring target computer 50 shown in FIG. 2. The virtualization mechanism 30 builds a virtual computer environment in the virtualization mechanism 30 by logically dividing resources of the monitoring target computer 50. The virtualization mechanism 30 controls guest OS's 31 operated in the virtualization mechanism 30 to independently execute various processes. The virtualization mechanism 30 allocates resources to the monitoring target computer 50 in response to a resource request issued from the guest OS 31 to the virtualization mechanism 30.

According to this embodiment, the virtualization mechanism 30 is configured by combining a so-called "hypervisor" with a so-called management OS for calling a function of the hypervisor. Alternatively, the virtualization mechanism 30 may be configured by combining a VM kernel of so-called VM ware with a so-called management OS.

The virtualization mechanism 30 builds first and second virtual computers 43a and 43b. A first guest OS 31a is operated in the first virtual computer 43a, while a second guest OS 31b is operated in the second virtual computer 43b.

The first and second guest OS's 31a and 31b are general OS's.

Hereinafter, when it is not necessary to specify any one of the first and second virtual computers 43a and 43b as in the case of the description applied to both of the first and second virtual computers 43a and 43b, each of the first and second virtual computers 43a and 43b will simply be referred to as virtual computer 43. Similarly, each of the first and second guest OS's 31a and 31b may simply be referred to as guest OS 31. The same applies to a performance information supply module 36, a performance monitoring agent 32, and a portions included therein.

The embodiment will be described by way of example where the monitoring target computer 50 includes two virtual computers 43. However, the monitoring target computer 50 can include an optional number of virtual computers 43.

The virtualization mechanism 30 includes a monitoring information supply module 35 and a message communication processing module 34.

The monitoring information supply module 35 includes host performance information 30a, first virtual computer monitoring information 30b, and second virtual computer monitoring information 30c. The first virtual computer monitoring information 30b and the second virtual computer monitoring information 30c contain virtual computer resource allocation information, virtual computer configuration information, and virtual computer performance information.

The host performance information 30a indicates a resource usage status of the monitoring target computer 50 in which the virtualization mechanism 30 operates.

For example, the host performance information 30a contains a CPU usage rate regarding a physical CPU 21, a usage rate of a memory 22, and a number of swapping times per unit time in the monitoring target computer 50.

The virtual computer resource allocation information indicates an allocation rate of resources of the monitoring target computer 50 allocated by the virtualization mechanism 30 to the virtual computer 43. The monitoring information supply module 35 includes information indicating a resource allocation rate for each virtual computer 43. For example, the first virtual computer monitoring information 30b contains first virtual computer resource allocation information indicating an allocation rate of resources to the first virtual computer 43a. The second virtual computer monitoring information 30c contains second virtual computer resource allocation rate indicating an allocation rate of resources to the second virtual computer 43b.

For example, the virtual computer resource allocation information contains information indicating a ratio of CPU time allocated to a virtual CPU of the virtual computer 43 in which the guest OS 31 operates, and information indicating a memory size allocated to the virtual computer 43.

The virtual computer configuration information is configuration information regarding calculation resources of the virtual computer 43. The monitoring information supply module 35 contains configuration information for each virtual computer 43. For example, the first virtual computer monitoring information 30b contains first virtual computer configuration information indicating a configuration of the first virtual computer 43a. The second virtual computer monitoring information 30c contains second virtual computer configuration information indicating a configuration of the second virtual computer 43b.

For example, the virtual computer configuration information contains pieces of information regarding the number of virtual CPU's of the virtual computer and a memory size of the virtual computer.

The virtual computer performance information is performance information regarding the virtual computer 43. The monitoring information supply module 35 includes performance information of each virtual computer 43. For example, the first virtual computer monitoring information 30b contains first virtual computer performance information indicating performance of the first virtual computer 43a. The second virtual computer monitoring information 30c contains second virtual computer performance information indicating performance of the second virtual computer 43b.

For example, the virtual computer performance information contains the number of swapping I/O times and a data I/O transfer rate regarding the virtual computer 43.

The message communication processing module 34 executes processes regarding communication between the virtual computers 43, communication between the virtual computer 43 and the virtualization mechanism 30, communication between the virtual computer 43 and an external computer (e.g., monitoring manager computer 51) connected to the monitoring target computer 50 via the network 26, and communication between the virtualization mechanism 30 and the external computer. Those communication processes in the virtual computer 43 are realized by memory copying in the monitoring target computer 50.

The first and second guest OS's 31a and 31b include performance information supply modules 36a and 36b, respectively. On the first and second guest OS's 31a and 31b, first and second performance monitoring agents 32a and 32b operate, respectively. Additionally, on the first and second guest OS's 31a and 31b, other application programs (not shown) operate.

The performance information supply modules 36a and 36b collect and manage pieces of performance information regarding the guest OS 31. Specifically, according to the embodiment, the performance information supply module 36a holds guest performance information 39a which is performance information of the first guest OS 31a. The performance information supply module 36b holds guest performance information 39b which is performance information of the second guest OS 31b.

For example, the guest performance information 39 contains a CPU usage rate, a memory usage rate, and a number of paging processing times per unit time. Those are pieces of performance information supplied by a general OS.

According to this embodiment, the guest OS 31 is a general OS conventionally used in a nonvirtualized computer. Thus, the guest OS 31 executes the same process as in the case of the guest OS 31 being installed in the nonvirtualized computer. In other words, the guest OS 31 can manage only resources allocated to the virtual computer 43 in which the guest OS 31 has been installed, but cannot know the amount of resources allocated to the other virtual computers 43. As a result, a CPU usage rate contained in the guest performance information 39 is a ratio of CPU time actually used in the virtual computer 43 with respect to CPU time allocated to the virtual computers 43.

The first and second performance monitoring agents 32a and 32b are application programs executed on the guest OS's 31a and 31b, respectively. The first and second performance monitoring agents 32a and 32b monitor the guest OS 31, the application programs executed on the guest OS 31, and the virtualization mechanism 30. The first performance monitoring agent 32a includes a monitoring information collection module 37a, a monitoring information management module 38a, and a monitoring information storage module 40a. The second performance monitoring agent 32b includes a monitoring information collection module 37b, a monitoring information management module 38b, and a monitoring information storage module 40b.

The monitoring information collection modules 37a and 37b control a process of collecting pieces of performance information managed by the guest OS's 31a and 31b, respectively. Further, the monitoring information collection modules 37a and 37b control a process of collecting pieces of performance information managed by the virtualization mechanism 30.

According to this embodiment, the monitoring information module 37a collects some or all pieces of guest performance information 39a from the performance information supply module 36a, and the monitoring information collection module 37b collects some or all pieces of performance information 39b from the performance information supply module 36b. Further, the monitoring information collection modules 37a and 37b collect, from the monitoring information supply module 35, host performance information 30a, and virtual computer resource allocation information, virtual computer configuration information, and virtual computer performance information (i.e., in this embodiment, first virtual computer monitoring information 30b and second virtual computer monitoring information 30c) regarding all the virtual computers 43.

The monitoring information management modules 38a and 38b control a process of storing the pieces of performance information collected by the monitoring information collection module 37 as pieces of monitoring information in the monitoring information storage modules 40a and 40b described below and managing the stored pieces of monitoring information.

The monitoring information storage modules 40a and 40b include virtual computer guest OS correspondence table storage areas (not shown), and performance monitoring agent guest OS correspondence table storage areas (not shown).

In the virtual computer guest OS correspondence table storage area, information for correlating the virtual computer with the guest OS is stored. For example, in the virtual computer guest OS correspondence table storage area, a virtual computer guest OS correspondence table 702 shown in FIG. 3A is recorded.

Figure 3A:
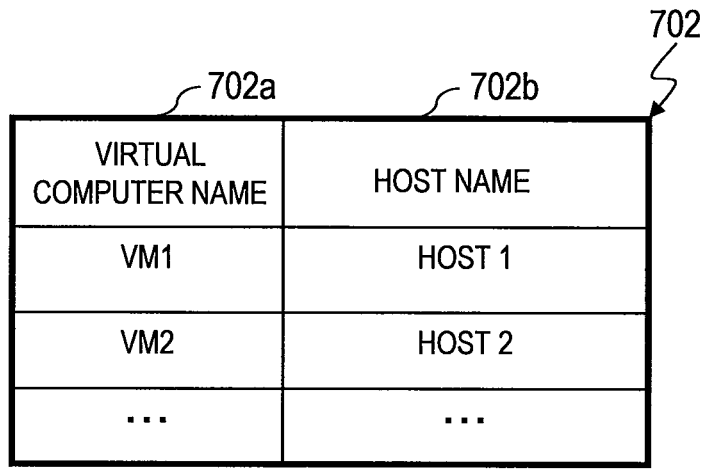
FIG. 3A shows a virtual computer guest OS correspondence table according to the first embodiment of this invention.

FIG. 3A shows the virtual computer guest OS correspondence table 702 according to the first embodiment of this invention.

The virtual computer guest OS correspondence table 702 includes a host name section 702b and a virtual computer name section 702a.

Host names set in the guest OS's 31a and 31b are stored in the host name section 702b. Each guest OS 31 is uniquely identified by a host name.

In the virtual computer name section 702a, a name of a virtual computer 43 in which the guest OS's 31a and 31b stored in the corresponding host name section 702b operate is stored.

In FIG. 3A, for example, "VM 1" is stored in the virtual computer name section 702a, and "HOST 1" is stored in the host name section 702b corresponding to the "VM 1". This indicates that a guest OS 31 identified by the "HOST 1" operates in the virtual computer 43 whose name is "VM 1".

In the performance monitoring agent guest OS correspondence table storage area, information for correlating the performance monitoring agent 32 with the guest OS 31 on which the performance monitoring agent 32 operates is stored. For example, a performance monitoring agent guest OS correspondence table 701 as shown in FIG. 3B is stored.

Figure 3B:
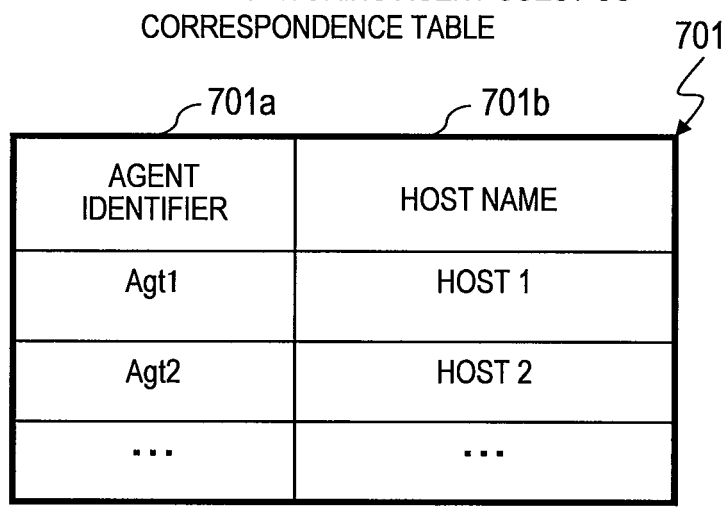
FIG. 3B shows a performance monitoring agent guest OS correspondence table according to the first embodiment of this invention.

FIG. 3B shows the performance monitoring agent guest OS correspondence table 701 according to the first embodiment of this invention.

The performance monitoring agent guest OS correspondence table 701 includes a performance monitoring agent identifier section 701a and a host name section 701b.

In the performance monitoring agent identifier section 701a, information for identifying the performance monitoring agent 32 is stored.

In the host name section 701b, host names set in the guest OS's 31a and 31b are stored.

In FIG. 3B, for example, "Agt 1" is stored in the performance monitoring agent identifier section 701a, and "HOST 1" is stored in a host name section 701b corresponding to the "Agt 1." This indicates that the performance monitoring agent 32 identified by the "Agt 1" is executed on the OS 31 identified by the "HOST 1."

According to this embodiment, the monitoring information management module 38a stores the pieces of monitoring information collected by the monitoring information collection module 37a in the monitoring information storage module 40a of the first performance monitoring agent 32a. The monitoring information management module 38b stores the pieces of monitoring information collected by the monitoring information collection module 37b in the monitoring information storage module 40b of the second performance monitoring agent 32b.

The monitoring information storage modules 40a and 40b are areas for storing the pieces of monitoring information collected by the performance monitoring agent 32. For example, the monitoring information storage module 40a may be a storage area in a virtual disk device (not shown) of the first virtual computer 43a, and the monitoring information storage module 40b may be a storage area in a virtual disk device of the second virtual computer. It should be noted that the virtual disk device is equivalent to, for example, a storage area allocated to each virtual computer among storage areas of an external storage system 25 described below. In this case, only the first performance monitoring agent 32a is permitted to execute reading/writing in the monitoring information storage module 40a, and only the second performance monitoring agent 32b is permitted to execute reading/writing in the monitoring information storage module 40b.

The monitoring information obtained from the monitoring information supply module 35 by the monitoring information collection module 37 is stored in the monitoring information storage module 40, for example, in a table structure of a monitoring information table 300 shown in FIG. 3C.

FIG. 3C shows the monitoring information table 300 according to the first embodiment of this invention.

The monitoring information table 300 includes a time section 300a, a virtual computer name section 300b, a resource name section 300c, a monitoring information name section 300d, and a monitoring information value section 300e.

In the time section 300a, the time of collecting pieces of monitoring information is stored.

In the virtual computer name section 300b, for example, a name set in the virtual computer 43 is stored.

In the resource name section 300c, an identifier of a virtual resource constituting the virtual computer 43 is stored. The virtual resource is, for example, a virtual CPU (vCPU) or a virtual I/O device.

In the monitoring information name section 300d, a name of monitoring information is stored.

In the monitoring information value section 300e, a statistical value of the resource 300c at the time of the time section 300a is stored.

For example, in FIG. 3C, "2007/01/11 10:00:00" is stored in the time section 300a, and "VM 1," "vCPU 1," "VIRTUAL CPU ALLOCATION RATE," and "30%" are stored in the virtual computer name section 300b, the resource name section 300c, the monitoring information name section 300d, and the monitoring information value section 300e corresponding to "2007/01/11 10:00:00," respectively. This indicates that at 10:00:00 on Jan. 11, 2007, 30% of entire CPU time of the CPU 21 of the monitoring target computer 50 is allocated to a virtual CPU identified by "vCPU 1" in a virtual computer 43 identified by "VM 1."

The monitoring information obtained from the performance information supply module 36 by the monitoring information collection module 37 is stored in the monitoring information storage module 40, for example, in a table structure of a guest performance information table 440 shown in FIG. 3D.

FIG. 3D shows the guest performance information table 440 according to the first embodiment of this invention.

The guest performance information table 440 includes a time section 440a, a host name section 440b, a resource name section 440c, a monitoring information name section 440d, and a monitoring information value section 440e.

In the time section 440a, the time of collecting pieces of monitoring information is stored.

In the host name section 440b, a host name of a guest OS 31 regarding an acquisition source of monitoring information stored in the monitoring information value section 440e is stored.

In the resource name section 440c, an identifier of a resource which is an acquisition source of the monitoring information stored in the monitoring information value section 440e is stored. The resource which is the acquisition source of the monitoring information is, for example, a virtual CPU (vCPU) or the like.

In the monitoring information name section 440d, a name of monitoring information of the collected pieces of monitoring information is stored.

In the monitoring information value section 440e, a value of the collected pieces of monitoring information is stored.

For example, in FIG. 3D, "2007/01/11 10:00:00" is stored in the time section 440a, and "GUEST OS 1," "vCPU 1," "VIRTUAL CPU USAGE RATE," and "30%" are stored in the host name section 440b, the resource name section 440c, the monitoring information name section 440d, and the monitoring information value section 440e corresponding to "2007/01/11 10:00:00," respectively. This indicates that at 10:00:00 on Jan. 11, 2007, a usage rate of a virtual CPU identified by the "vCPU 1" is 30%. This example also indicates that the monitoring information collection module 37 has obtained the CPU usage rate "30%" from an OS 31 identified by the "GUEST OS 1."

FIG. 3E shows a management table 310 according to the first embodiment of this invention.

In the management table 310, monitoring information and information regarding an acquisition source from which the monitoring information has been obtained are stored. The management table 310 includes a monitoring information name section 310a and an acquisition source name section 310b. In the monitoring information name section 310a, a name of an obtained monitoring information is stored. In the acquisition source name section 310b, a name of an acquisition source of monitoring information identified by the name stored in the monitoring information name section 310a is stored. For example, if the name stored in the monitoring information name section 310a is a name of monitoring information obtained from the performance information supply module 36a or 36b, a name "GUEST OS" of the acquisition source of the monitoring information is stored in an acquisition source name section 310b corresponding to the name. On the other hand, if monitoring information is obtained from the monitoring information supply module 35, "VIRTUALIZATION MECHANISM" is stored in the acquisition source name section 310b.

The management table 310 can be easily created when the monitoring information management modules 38a and 38b obtain information from the performance information supply modules 36a and 36b or the monitoring information supply module 35. The management table 310 is stored in the monitoring information storage modules 40a and 40b.

The monitoring target computer 50 as described above can be realized by a computer 20 of a hardware configuration shown in FIG. 2.

FIG. 2 is a block diagram showing a hardware configuration of the monitoring target computer 50 according to the first embodiment of this invention.

The computer 20 to realize the monitoring target computer 50 includes a CPU 21, a main storage system (memory) 22, an external storage system 25, an external storage system interface 23 for connection with the external storage system 25, a network 26, and a communication interface 24 for connection with the network 26. The computer 20 may further include an input device and an output device. The input device is, for example, a mouse/keyboard 27. The output device is, for example, a monitor 28.

The memory 22 is a data storage system such as a semiconductor memory. For example, in the memory 22 of the computer 20, the guest OS's 31a and 31b executed by the CPU 21, the application programs operated on the guest OS's 31, and the virtualization mechanism 30 are stored.

The external storage system 25 is, for example, a hard disk device or a storage device of another type. The monitoring information storage module 40 can be realized as a storage area in the external storage system 25. The monitoring information collection modules 37a and 37b, and the monitoring information management modules 38a and 38b can be realized by executing predetermined programs stored in the external storage system 25 by the CPU 21. The network 26 may be realized by any communication system. For example, the network 26 may be a wired or wireless network.

FIG. 1 is referred to again.

The monitoring manager computer 51 includes a performance monitoring manager 48. The performance monitoring manager 48 includes a monitoring information management module 47.

The monitoring information management module 47 analyzes a processing request message from the operation management terminal 52, and transmits a processing request message to each of the performance monitoring agents 32a and 32b according to a result of the analysis. The monitoring information management module 47 analyzes the contents of messages received from the performance monitoring agents 32a and 32b, and executes a processing operation according to a result of the analysis to respond to the operation management terminal 52.

The monitoring manager computer 51 thus configured can be realized by the computer 20 shown in FIG. 2 as in the case of the monitoring target computer 50. For example, the performance monitoring manager 48 is a program stored in the memory 22 to be executed by the CPU 21, and the monitoring information management module 47 is a program module constituting the performance monitoring manager 48. The operation management terminal 52 includes an input module 53, an output module 54, a communication processing module 55, and a transmission/reception module 57.

The communication processing module 55 controls a process of transmitting information input via the input module 53 described below to the monitoring manager computer 51 via the transmission/reception module 57 described below.

The communication processing module 55 controls a process of editing information received from the monitoring manager computer 51 in a predetermined display form to output the information to the output module 54 described below.

The input module 53 is an input device for receiving an input from the operator of the operation management terminal 52.

The output module 54 is an output device for notifying predetermined information to the operator of the operation management terminal 52.

The transmission/reception module 57 is a device for transmitting/receiving information via the network 26.

The operation management terminal 52 thus configured can be realized by the computer 20 shown in FIG. 2 as in the case of the monitoring target computer 50. The communication processing module 55 can be realized by executing a program read from the memory 22 by the CPU 21. The input module 53 can be realized by an input device such as the mouse/keyboard 27. The output module 54 can be realized by an output device such as the monitor 28. The transmission/reception module 57 can be realized by the communication interface 24.

It should be noted that FIG. 1 shows a case where the monitoring target computer 50, the monitoring manager computer 51, and the operation management terminal 52 are realized by different computers 20. However, two or all of those computers and the terminals may be realized by the same computers 20.

This embodiment shows an example where two virtual computers, i.e., the first and second virtual computers 43a and 43b, are disposed in the monitoring target computer 50. However, this embodiment is not limited to this example. In other words, one virtual computer 43, or three or more virtual computers may be disposed in the monitoring target computer 50. Other devices may also be added.

Next, a flow of a process executed by the performance monitoring agent 32 will be described.

FIG. 4A is a flowchart showing a process of collecting pieces of performance information by the performance monitoring agent 32 according to the first embodiment of this invention.

(1) First, the operator of the information processing system performs initialization (step 400).

Specifically, for example, the operator of the information processing system loads the performance monitoring agents 32a and 32b and the monitoring information management modules 38a and 38b via the operation management terminal 52, and stores a collection information management table in the monitoring information storage modules 40a and 40b of the performance monitoring agents 32a and 32b.

The collection information management table is a table defining pieces of monitoring information collected by the performance monitoring agents 32a and 32b. In the collection information management table, pieces of performance information collected by the performance monitoring agent 32, and contents indicating an acquisition target from which the pieces of performance information are obtained, acquisition resources, and an interval of obtaining the pieces of performance information by the performance monitoring agent 32 (i.e., acquisition monitoring interval) are registered. In other words, the performance monitoring agent 32 can know what types of performance information of what resources should be obtained at what interval by referring to the collection information management table.

Initially, in the monitoring information storage modules 40a and 40b of the performance monitoring agents 32a and 32b, a reference destination of the performance information supply modules 36a and 36b of the guest OS's 31a and 31b, and a reference destination of the monitoring information supply module 35 of the virtualization mechanism 30 are stored. Information of the reference destination indicates reference information loaded to execute monitoring information collection process by the monitoring information collection modules 37a and 37b. For example, the operator of the information processing system stores a service end point of web services provided from the monitoring information supply module 35 of the virtualization mechanism 30 as a reference destination of the monitoring information supply module 35 of the virtualization mechanism 30 via the operation management terminal 52.

(2) Next, upon reception of a performance information collection start request message from the performance monitoring manager 48, the monitoring information collection modules 37a and 37b of the performance information monitoring agent periodically collect performance information from the performance information supply modules 36a and 36b of the guest OS and monitoring information from the monitoring information supply module 35 of the virtualization mechanism 30 (step 401).

Specifically, the monitoring information collection modules 37a and 37b read the reference destination of the performance information supply modules 36a and 36b of the guest OS and the reference destination of the monitoring information supply module 35 of the virtualization mechanism 30 from the monitoring information storage modules 40a and 40b via the monitoring information management modules 38a and 38b. The monitoring information collection modules 37a and 37b also read the collection information management table from the monitoring information storage modules 40a and 40b via the monitoring information management modules 38a and 38b. Based on interface specifications for loading the monitoring information supply module 35 and the performance information supply modules 36a and 36b from the reference destination, monitoring information written in the performance information section regarding a resource as a performance information acquisition target of the monitoring information table is obtained.

The monitoring information supplied from the monitoring information supply module 35 of the virtualization mechanism 30 may be obtained by loading, for example, web services provided from the monitoring information supply module 35 via the virtual network, and a defined interface. The performance information of the guest OS's 31a and 31b may be obtained by loading, for example, a library for obtaining performance information.

The step 401 is periodically (i.e., at each collection time interval) executed. This periodical execution is carried out by calling a timer mechanism (not shown) of the monitoring target computer 50, and executing schedule management.

(3) Next, the monitoring information management modules 38a and 38b of the performance monitoring agent store the pieces of performance information collected by the monitoring information collection modules 37a and 37b of the performance monitoring agents 32a and 32b in the monitoring information storage modules 40a and 40b of the performance monitoring agent (step 402).

For example, the monitoring information management modules 38a and 38b of the performance monitoring agent store the obtained performance information, by adding a time stamp of the obtained thereto, in a table similar to that shown in FIG. 3C or 3D.

Then, after a passage of the collection time interval, the step 401 is executed again.

Figure 4B:
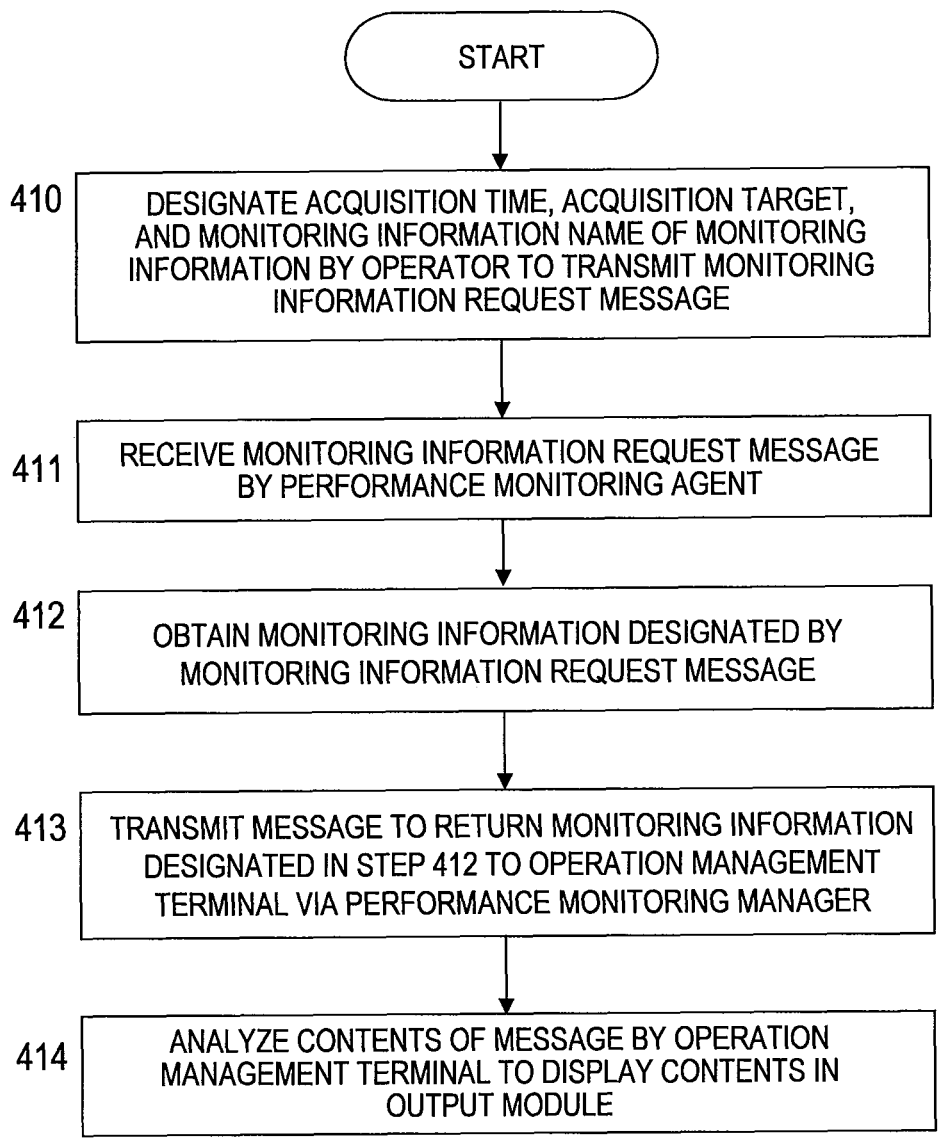
FIG. 4B is a flowchart showing a process of returning monitoring information to an operation management terminal by the performance monitoring agent via a performance monitoring manger according to the first embodiment of this invention.

FIG. 4B is a flowchart showing a process of returning monitoring information to the operation management terminal 52 by the performance monitoring agent 32 via the performance monitoring manger 48 according to the first embodiment of this invention.

(1) First, the operator of the information processing system transmits a monitoring information request message from the operation management terminal 52 to the performance monitoring agents 32a and 32b via the performance monitoring manager 48 (step 410).

In the monitoring information request message, acquisition time of monitoring information for specifying monitoring information to be obtained by the operator, and list information of acquisition target names and performance information names to be obtained are designated.

(2) The monitoring information management modules 38a and 38b of the performance monitoring agents 32a and 32b receive the monitoring information request message transmitted from the performance monitoring manager 48. The monitoring information management modules 38a and 38b obtain the time, the acquisition target name, a resource name, and the performance information name list information from the received monitoring information request message (step 411). It should be noted that the monitoring information management modules 38a and 38b are in standby statuses until reception of the monitoring information request message.

(3) Then, the monitoring information management modules 38a and 38b read the monitoring information table 300 and the guest performance information table 440 from the monitoring information storage modules 40a and 40b to obtain records containing information requested by the monitoring information acquisition message (step 412). Specifically, the monitoring information management modules 38a and 38b obtain records in which values equal to the performance name and the acquisition time contained in the monitoring information acquisition message are stored in the monitoring information name section 300d and the time section 300a from the monitoring information table 300. The monitoring information management modules 38a and 38b further obtain records in which values equal to the performance information name and the acquisition time contained in the monitoring information acquisition message are stored in the monitoring information name section 440d and the time section 440a from the performance information table 440.

This process will be described below in detail referring to FIG. 4C.

(4) The monitoring information management modules 38a and 38b designate the obtained records to transmit a monitoring information response message to the performance monitoring manager 48 (step 413). In other words, the monitoring information response message contains values stored in the host name section 440b, the virtual computer name section 300b, the resource name sections 300c and 440c, the monitoring information name sections 300d and 440d, the monitoring information value sections 300e and 440e, and the time sections 300a and 440a of the records obtained in step 412. When a plurality of records are designated, the monitoring information management modules 38a and 38b transmit a monitoring information response message containing pieces of information of the plurality of the designated records to the operation management terminal 52 via the performance monitoring manager 48.

(5) Then, after the communication processing module 55 of the operation management terminal 52 has received a message transmitted from the monitoring information management module 47 of the performance monitoring manager 48 via the transmission/reception module 57, the output module 54 outputs performance information contained in the message to an output device (e.g., monitor 28) (step 414).

Figure 4C:
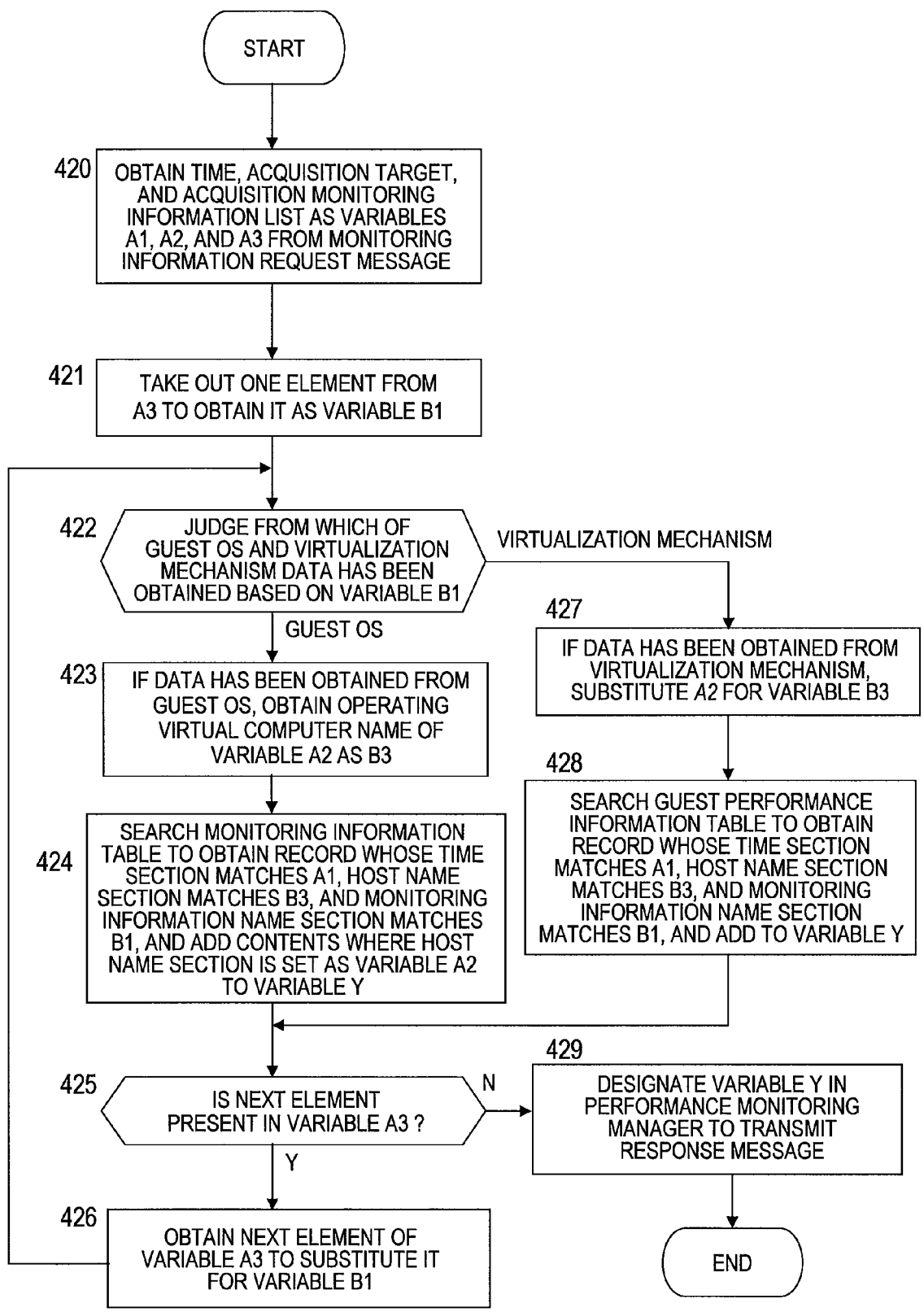
FIG. 4C is a flowchart showing an example of correlating pieces of information collected from a performance information supply modules with pieces of information collected from a monitoring information supply module by a monitoring information management modules of the performance information monitoring agents according to the first embodiment of this invention.

FIG. 4C is a flowchart showing an example of correlating pieces of information collected from the performance information supply modules 36a and 36b with pieces of information collected from the monitoring information supply module 35 by the monitoring information management modules 38a and 38b of the performance information monitoring agents 32a and 32b according to the first embodiment of this invention.

(1) Upon reception of the monitoring information request message, the monitoring information management modules 38a and 38b of the performance monitoring agents 32a and 32b extract time, an acquisition target, and an acquisition monitoring information table (not shown). The monitoring information management modules 38a and 38b obtain the extracted time, the acquisition time, and the acquisition monitoring information table as variables A1 to A3 (step 420), respectively.

The extracted time is time information for designating the time corresponding to monitoring information to be obtained.

The acquisition target contains information indicating a target from which monitoring information is to be obtained. For example, the acquisition target contains information for designating the first virtual computer 43a, the second virtual computer 43b, the first guest OS 31a, or the second guest OS 31b.

The acquisition monitoring information table shows a list of pieces of information regarding monitoring information to be obtained.

(2) Next, the monitoring information management modules 38a and 38b take out one element from the variable A3 to set it as a variable B1 (step 421).

(3) Then, the monitoring information management modules 38a and 38b search the management table 310 to extract a value of the acquisition source name section 310b of a record whose monitoring information name section 310a matches the variable B1, and set the extracted value as a variable B2. The monitoring information management modules 38a and 38b judge which of "GUEST OS" and "VIRTUALIZATION MECHANISM" the variable B2 is (step 422).

(4) In the step 422, if the variable B2 is judged to be "GUEST OS," the received monitoring information request message requests performance information obtained from the guest OS 31. In this case, the monitoring information management modules 38a and 38b search the virtual computer guest OS correspondence table 702 stored in the monitoring information storage modules 40a and 40b to extract contents of a host name section 702b of a record whose virtual computer name section 702a matches the variable A2, and obtain the extracted contents as a variable B3 (step 423).

(5) The monitoring information management modules 38a and 38b search the guest performance information table 440 stored in the monitoring information storage sections 40a and 40b to extract a record where the time section 440a matches the variable A1, the resource name section 440c matches the variable B3, and the monitoring information name section 440d matches the variable A3, and add the extracted record to a variable Y (step 424).

Numbering and naming rules of the resource name section 300c of the monitoring information obtained from the monitoring information supply module 35 may be different from those of the resource name section 440c of the monitoring information obtained from the performance information supply modules 36a and 36b. In such a case, for example, the following process is executed.

The operator inputs a naming rule correspondence table (not shown) between the guest OS 31 and the virtual computer 43 from the operation management terminal 52. The naming rule correspondence table is stored in the monitoring information storage module 40. The monitoring information management module 38 can retrieve a correlation by searching the naming rule correspondence table. The naming rule correspondence table can be easily created when numbering and naming rules are known beforehand.

The resource name section 440c of the guest performance information table 440 and the resource name section 300c of the monitoring information table 300 can be correlated with each other based on identifier information related to resources corresponding to respective names. For example, when resource names to be correlated are names of a virtual network interface card (NIC), they can be correlated with each other by referring to MAC address information related to a virtual NIC to judge matching. Resource relation information is defined from the operation management terminal 52, and the resource names can be correlated based on the definition. Further, a correlation between monitoring information values of records including resource name sections 440c and 300c of the guest performance information table 440 and the monitoring information table 300 is analyzed, and the records can be correlated with each other based on a result of the analysis.

(6) If the variable B2 is judged to be "VIRTUALIZATION MECHANISM 30" in the step 422, the received monitoring information request message requests monitoring information obtained from the virtualization mechanism 30. In this case, the monitoring information management modules 38a and 38b substitute contents of the variable A2 for the variable B3 (step 427).

(7) Next, the monitoring information management modules 38a and 38b search the monitoring information table 300 in which the information obtained from the monitoring information supply module 35 has been recorded to extract a record where the time section 300a matches the variable A1, the resource name section 300c matches the variable B3, and the monitoring information name section 300d matches the variable A3, and add the extracted record to the variable Y (step 428).

(8) Next, the monitoring information management modules 38a and 38b obtain a next element from the variable A3, and store the content of the element in the variable B1 to return to the step 422 (step 426). If there is no next element, the monitoring information management modules 38a and 38b designate a value of the variable Y to transmit a response message to the performance monitoring manager 48 (step 429).

The correlation process is not essential for displaying (step 414) in the operation management terminal 52. In other words, the obtained monitoring information may be displayed without executing correlation, or a correlation may not be displayed.

According to the example, the monitoring information management modules 38a and 38b read the pieces of information obtained from the performance information supply modules 36a and 36b and the monitoring information supply module 35 from the monitoring information storage modules 40a and 40b to correlate the pieces of read information with each other. Instead, the monitoring information management modules 38a and 38b may execute a correlation process before storage of the pieces of monitoring information collected from the performance information supply modules 36a and 36b and the monitoring information supply module 35. In place of the monitoring information management modules 38a and 38b, the monitoring information management module 47 of the performance monitoring manager 48 can execute a correlation.

In the correlation process, the virtual computer guest OS correspondence table 702 may be configured by being input from the operation management terminal 52 by the operator, or automatically configured based on information obtained from a computer (not shown) connected to the network 26 to manage configuration information. The computer for managing the configuration information manages a correlation between the guest OS 31 and the virtual computer 43, and returns the correlation when requested.

In short, when one of the records of the monitoring information table 300 is designated by a monitoring information request message, a record of the guest performance information table 440 corresponding to the designated record is specified by the correlation process shown in FIG. 4C. When one of the records of the guest performance information table 440 is designated by a monitoring information request message, a record of the monitoring information table 300 corresponding to the designated record is specified by the correlation process shown in FIG. 4C.

Specifically, if contents of the time sections 300a and 440a of the records match each other, contents of the resource name sections 300c and 440c match each other, contents of the monitoring information name sections 300d and 440d mach each other, and the guest OS 31 identified by the host name section 440b operates in the virtual computer 43 identified by the virtual computer name section 300b, the records correspond to each other.

As described above, the monitoring information table 300 includes a resource allocation rate to each virtual computer 43. On the other hand, the guest performance information table 440 includes a usage rate indicating a rate of actually used resources with respect to resources allocated to each virtual computer 43. Thus, an actual resource usage rate of the monitoring target computer 50 at a certain point can be calculated based on contents of the monitoring information value sections 300e and 440e of the two records correlated by the process shown in FIG. 4C.

For example, in each of the examples of FIGS. 3C and 3D, head records of the respective tables correspond to each other. According to this example, at 10:00:00 on Jan. 11, 2007, 30% of the entire CPU time of the CPU 21 of the monitoring target computer 50 is allocated to the virtual CPU identified by "vCPU 1," and 30% thereof is actually used. In other words, 30% of 30% of the entire CPU time (i.e., 9% of the entire CPU time) of the CPU 21 of the monitoring target computer 50 is used by the virtual CPU identified by the "vCPU 1."

The resource usage rate of a certain virtual computer 43 increases, so throughput of the virtual computer 43 may be reduced. When such a failure occurs, an effective method of dealing with the performance reduction can be decided by calculating a (physical) resource usage rate of the monitoring target computer 50 as described above. For example, even when a resource monitoring information value 440e of the virtual computer 43a is high, the throughput of the virtual computer 43a may be increased by newly allocating some of allocated resources of the virtual computer 43b to the virtual computer 43a. Specifically, by calculating a resource usage rate of the monitoring target computer 50 actually used by the virtual computer 43a, the presence of resources not used actually can be obtained even when the resources are allocated to a certain virtual computer 43. By newly allocating those resources to the performance-reduced virtual computer 43, performance can be improved without affecting throughput of the other virtual computer 43.

As failure patterns indicating failures of the virtual computer 43, the following examples can be cited.

A pattern where a CPU usage rate (i.e., value stored as a monitoring information value 440e) of the guest performance information 39 is high, a physical CPU usage rate (i.e., usage rate of the CPU 21 of the monitoring target computer 50) is not high, and a CPU allocation rate of the virtual computer 43 corresponding to the guest OS 31 is limited by a CPU allocation upper limit. In this case, it can be judged that CPU allocation upper limit setting is a bottleneck. Accordingly, to deal with the failure, the CPU allocation upper limit value is increased.

A pattern where a frequent occurrence of paging is obtained from the guest performance information 39. This indicates that a memory size set in the virtual computer 43 is small.

A pattern where a frequent occurrence of swap I/O processing is obtained from performance information of the virtual computer 43. This shows a shortage of a memory size allocated to the virtual computer 43.

According to the first embodiment of this invention, by using the aforementioned method, pieces of minimum necessary information for monitoring the guest OS 31 can be collected in the guest OS 31, and the guest OS 31 can be monitored based on the collected pieces of information. Further, according to the first embodiment of this invention, performance can be monitored in each of the plurality of guest OS's 31. Thus, monitoring can be carried out at a place close to the guest OS of a monitoring target.

When the performance monitoring agent 32 of a certain guest OS 31 stops due to one failure or another, the performance monitoring agent 32 in the other guest OS 31 collects pieces of monitoring information of the virtual computer 43 in which the performance monitoring agent 32 stopped due to the failure operates from the virtualization mechanism 30. Accordingly, by monitoring the information, monitoring of the virtual computer 43 can be continued.

When a so-called live migration process of migrating the virtual computer 43 to the other monitoring target computer 50 is executed, the virtual computer 43 can be migrated while pieces of monitoring information collected before the execution of the live migration process are held in the monitoring information storage module 40. Accordingly, the operator can obtain the monitoring information monitored before the live migration process from the operation management terminal 52 even after the live migration process of the virtual computer 43.

The process of collecting the pieces of monitoring information from the monitoring information supply module 35 by the monitoring information collection modules 37a and 37b is carried out only by copying in the memory of the monitoring target computer 50 without using the physical network 26. Accordingly, pieces of monitoring information can be collected without being affected by a failure or a delay of the network 26.

Further, the first embodiment of this invention can be realized by installing the performance monitoring agent 32 on the conventional guest OS 31 operated on the conventional virtualization mechanism 30. In other words, according to the first embodiment of this invention, it is not necessary to change the conventional virtualization mechanism 30 and the conventional guest OS 31.

Next, a second embodiment of this invention will be described.

Figure 5:
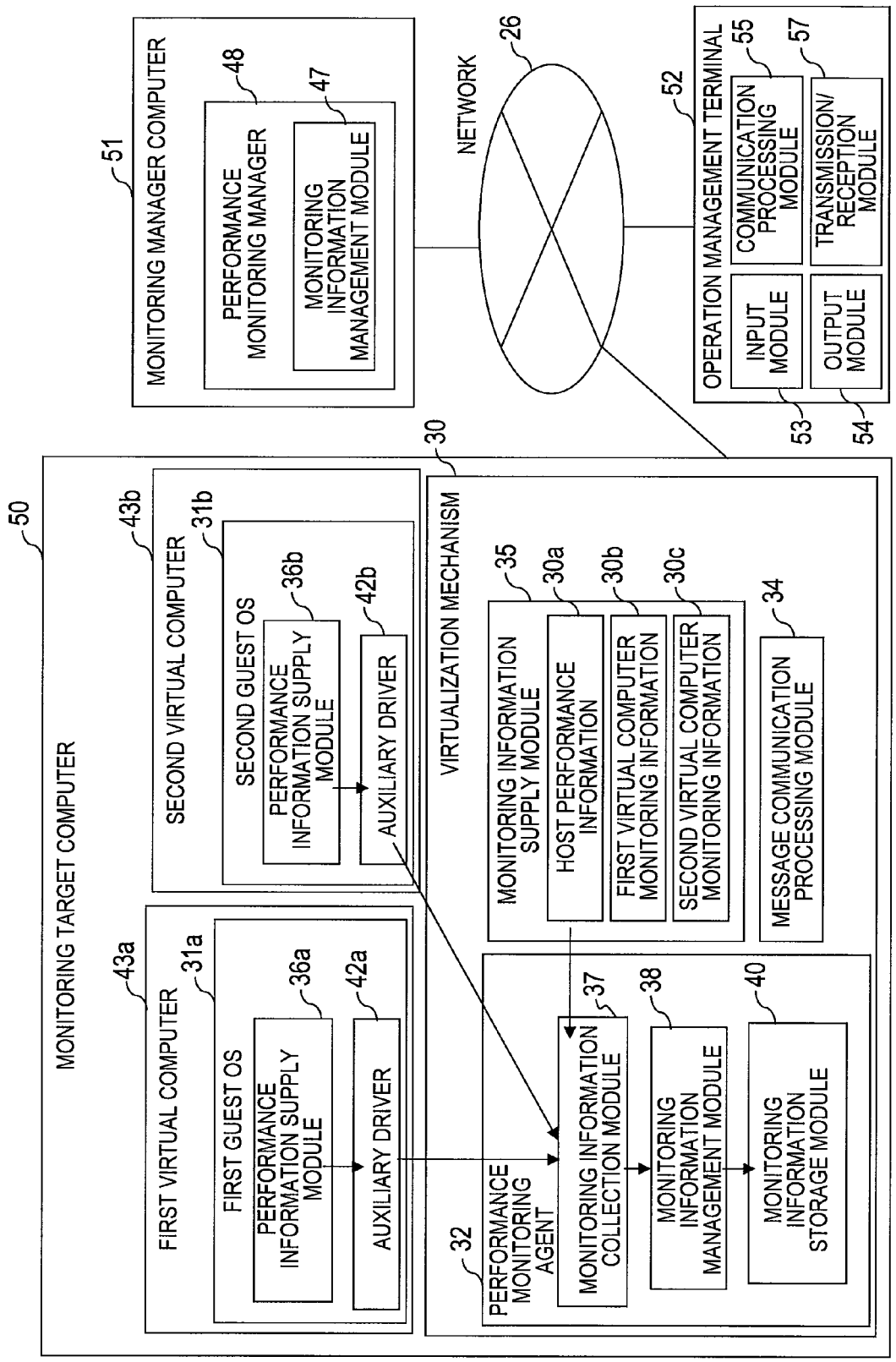
FIG. 5 is a functional block diagram showing a configuration of an information processing system according to a second embodiment of this invention.

FIG. 5 is a functional block diagram showing a configuration of an information processing system according to the second embodiment of this invention.

According to the information processing system of the second embodiment of this invention, unlike the first embodiment of this invention where the performance monitoring agent 32 operates on the guest OS 31, a performance monitoring agent 32 operates in a virtualization mechanism 30. Hereinafter, portions of the configuration and a processing operation of the information processing system of the second embodiment of this invention different from those of the first embodiment of this invention will be described. Portions similar to those of the first embodiment of this invention will be omitted.

Guest OS's 31a and 31b include auxiliary drivers 42a and 42b, respectively. The auxiliary drivers 42a and 42b are programs for assisting a processing operation of the performance monitoring agent 32. Upon reception of a processing request from outside the guest OS's 31a and 31b, processing is executed in the guest OS's 31a and 31b to return a processing result. Instructions given to the auxiliary drivers 42a and 42b from the performance monitoring agent 32 and responses of the auxiliary drivers 42a and 42b to the performance monitoring agent 32 are carried out by using a message communication processing module 34 of the virtualization mechanism 30.

The performance monitoring agent 32 operates not on the guest OS's 31a and 31b but on a so-called management OS of the virtualization mechanism 30.

For example, a service console is described in Non-patent Document "VMWare Infrastructure Resource Management Guide" (http://www.vmware.com/ja/pdf/vi3_esx_resource_mgmt_ja.pdf). The performance monitoring agent 32 may operate on such a service console.

The performance monitoring agent 32 includes a monitoring information collection module 37, a monitoring information management module 38, and a monitoring information storage module 40.

An example of a processing operation where the performance monitoring agent 32 stores monitoring information in the monitoring information storage module 40 will be described.

(1) The monitoring information collection module 37 periodically collects pieces of monitoring information from a monitoring information supply module 35 (step 500) (not shown).

(2) The monitoring information collection module 37 transmits a message for requesting acquisition of guest performance information 39 held in the performance information supply module 36 to the auxiliary drivers 42a and 42b of the guest OS's 31a and 31b (step 501) (not shown).

(3) Upon reception of the request message, the auxiliary drivers 42a and 42b obtain guest performance information 39 from the performance information supply module 36. Then, the auxiliary drivers 42a and 42b designate obtained information to send a response message to the monitoring information collection module 37 (step 504) (not shown).

(4) The monitoring information collection module 37 obtains the performance information returned from the auxiliary drivers 42a and 42b (step 506) (not shown).

(5) The monitoring information management module 38 writes the performance information obtained by the monitoring information collection module 37 in the monitoring information storage module 40 (step 508) (not shown).

(6) After a passage of certain time from the last information acquisition, the process returns to the step 500.

According to the second embodiment of this invention, by using the aforementioned method, the guest OS 31 and the virtual computer 43 can be monitored, and an effective dealing method can be decided. Without operating any agents on the guest OS's 31a and 31b, performances are managed en bloc on the virtualization mechanism 30 to enable correlation between performance information of all the guest OS's 31a and 31b and performance information of the virtual computer 43. Thus, performance analysis using the guest performance information 39 and the information of the virtual computer 43 can be carried out for all the guest OS's 31a and 31b. Moreover, because no performance information is overlapped in the virtual computer 43 for each guest OS 31, a size of data to be held can be saved.

Unlike the first embodiment of this invention, because it is not necessary to install a performance monitoring agent for each of the guest OS's 31a and 31b, and a performance monitoring agent only needs to be installed on the virtualization mechanism 30, running costs are small. In addition, the information processing system is also excellent in program development because it is not necessary to create a performance monitoring agent program for a platform of each of the guest OS's 31*a* and 31*b*.

The process of collecting pieces of monitoring information from the monitoring information supply module 35 by the monitoring information collection module 37 can be realized by copying in the memory 22 of the monitoring target computer 50 without using a physical network 26. Thus, pieces of monitoring information can be collected without being affected by a failure or a delay of the network 26.

The first and second embodiments of this invention can be combined.

In other words, a system may be configured such that it includes performance monitoring agents 32*a* and 32*b* operated on the guest OS's 31*a* and 31*b* to obtain performance information of the guest OS's, and a performance monitoring agent 32 operated in the virtual computer 43 to collect pieces of monitoring information from the monitoring information supply module 35. In this case, the pieces of collected performance information are stored in the monitoring information storage module 40. The monitoring information management module 38 returns the stored monitoring information in response to a request from the performance monitoring manager 48. The performance monitoring manager 48 executes correlation for the returned information (refer to FIG. 4C) to return the correlated monitoring information to the operation management terminal 52.

Next, a third embodiment of this invention will be described.

Figure 6:
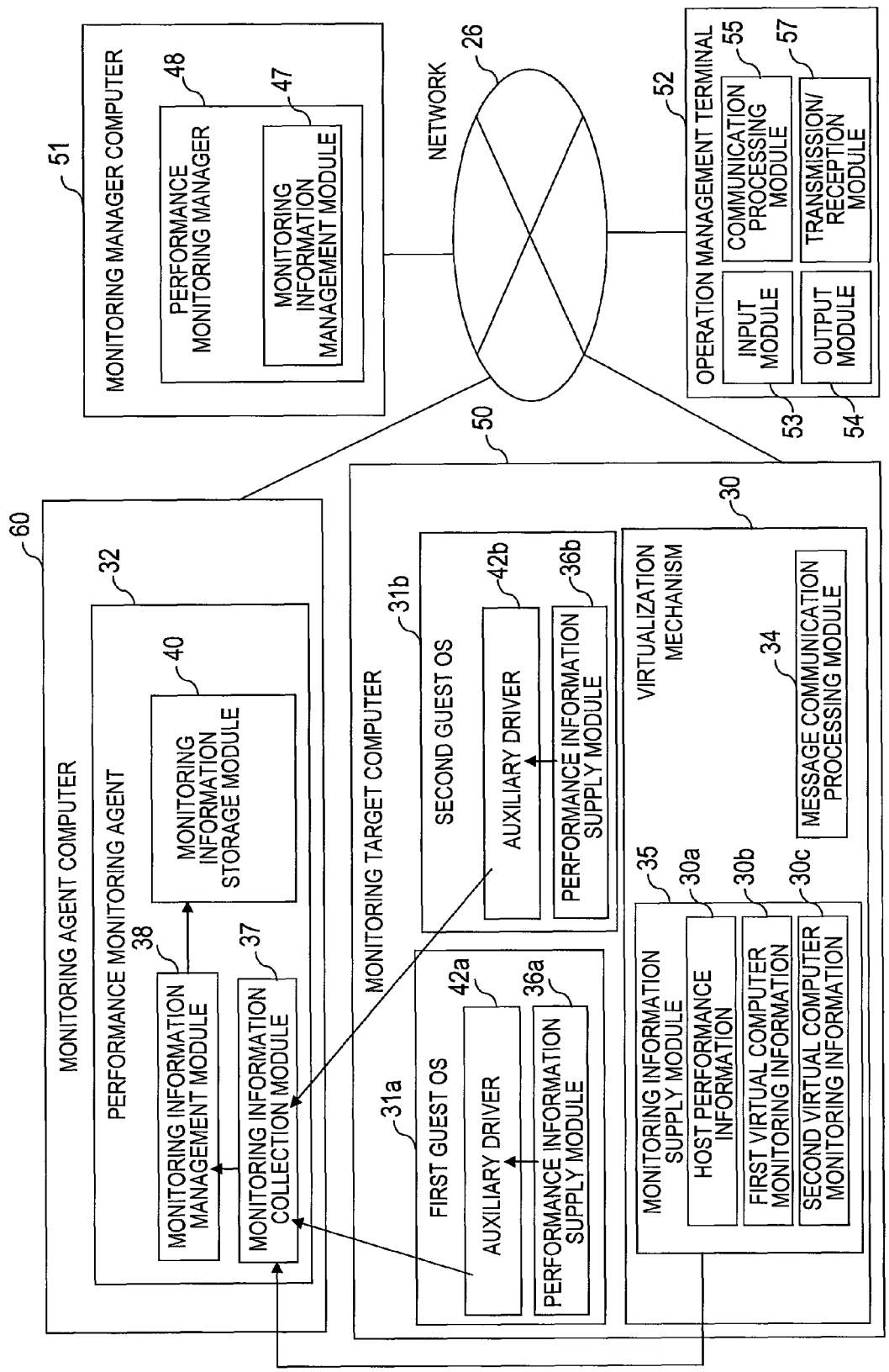
FIG. 6 is a functional block diagram showing a configuration of an information processing system according to a third embodiment of this invention.

FIG. 6 is a functional block diagram showing a configuration of an information processing system according to the third embodiment of this invention.

According to the information processing system of the third embodiment of this invention, unlike the first embodiment of this invention where the performance monitoring agent 32 operates in the monitoring target computer 50, the performance monitoring agent 32 operates in another computer.

The configuration of the information processing system of the third embodiment of this invention of this invention will be described below. However, description of the components similar to those of the information processing system of the first embodiment of this invention will be omitted.

The information processing system of the third embodiment of this invention includes a computer system which includes a monitoring agent computer 60, a monitoring target computer 50, a monitoring manager computer 51, and an operation management terminal 52. The monitoring agent computer 60, the monitoring target computer 50, the monitoring manager computer 51, and the operation management terminal 52 are interconnected via a network 26. The third embodiment of this invention shown in FIG. 6 shows an example where the monitoring agent computer 60, the monitoring manager computer 51, and the operation management terminal 52 are interconnected via a network. However, those components do not need to be interconnected via the network. In other words, some or all parts of the monitoring agent computer 60, the monitoring manager 48, and the operation management terminal 52 may be realized in the same computer.

The monitoring agent computer 60 includes a performance monitoring agent 32.

The performance monitoring agent 32 includes a monitoring information collection module 37, a monitoring information management module 38, and a monitoring information storage module 40.

The monitoring information storage module 40 is an area for storing pieces of information collected by the monitoring information collection module 37, and is equivalent to a storage area of an external storage system 25 in the monitoring agent computer 60. The monitoring information management module 38 stores the pieces of information collected by the monitoring information collection module 37 in the monitoring information storage module 40.

The monitoring target computer 50 includes a virtualization mechanism 30. The virtualization mechanism 30 builds first and second virtual computers 43*a* and 43*b*. The first and second virtual computers 43*a* and 43*b* operate first and second guest OS's 31*a* and 31*b*, respectively.

The first guest OS 31*a* includes an auxiliary driver 42*a* and a performance information supply module 36*a*. The second guest OS 31*b* includes an auxiliary driver 42*b* and a performance information supply module 36*b*. The auxiliary drivers 42*a* and 42*b* are programs for assisting a processing operation of a performance monitoring agent. Upon reception of a processing request from outside the guest OS 31, the auxiliary drivers 42*a* and 42*b* execute processing in the guest OS 31 to return a processing result.

As in the case of the monitoring target computer 50, the monitoring manager computer 51, and the operation management terminal 52, the monitoring agent computer 60 can be realized by the hardware configuration of the computer 20 shown in FIG. 2. The performance monitoring agent 32 is a program stored in the external storage system 25. The performance monitoring agent 32 is read in the memory 22, and executed by the CPU 21 to realize processing of each module of the performance monitoring agent 32.

A processing operation of collecting pieces of monitoring information by the monitoring information collection module 37 of the embodiment will be described.

(1) The monitoring information collection module 37 obtains host performance information 30*a*, first virtual computer monitoring information 30*b*, and second virtual computer monitoring information 30*c* from the monitoring information supply module 35 of the monitoring target computer 50 via the network 26 by using a communication interface 24 of the monitoring agent computer 60 (step 301) (not shown). The first virtual computer monitoring information 30*b* and the second virtual computer monitoring information 30*c* contain virtual computer resource allocation information, virtual computer configuration information, and virtual computer performance information regarding the first and second virtual computers 43*a* and 43*b*.

(2) By the same timing as that of the step 301, the monitoring information collection module 37 issues a performance information acquisition request of the guest OS 31 to the auxiliary drivers 42*a* and 42*b* of the guest OS 31 (step 302) (not shown). The auxiliary drivers 42*a* and 42*b* obtain requested performance information from the performance information supply modules 36*a* and 36*b* to return the same to the monitoring information collection module 37.

(3) The monitoring information management module 38 stores the pieces of monitoring information (30*a* to 30*c*) collected in the step 301 and the guest performance information in the monitoring information storage module 40 (step 303) (not shown).

By using the aforementioned method, according to the third embodiment of this invention, the monitoring agent computer 60 physically independent of the monitoring target computer 50 can monitor the virtual computer.

According to the first embodiment of this invention, when a failure occurs in one of the monitoring target computer 50 to be monitored, the virtualization mechanism 30, and the guest OS 31, the performance monitoring agent 32 operated in the failure occurrence place cannot refer to the information stored in the monitoring information storage module 40 before the failure occurrence. According to the second embodiment of this invention, when a failure occurs in the virtualization mechanism 30, the performance monitoring agent 32 cannot refer to the information stored in the monitoring information storage module 40 before the failure occurrence. According to the third embodiment of this invention, however, the monitoring agent computer 60 is physically independent of the monitoring target computer 50. Thus, even if a failure occurs in one of the monitoring target computer 50 to be monitored, the virtualization mechanism 30, and the guest OS 31, the information stored in the monitoring information storage module 40 before the failure occurrence can be referred to, and the information can be used for deciding a failure dealing method.

The first and third embodiments of this invention can be combined together.

In other words, a system may be configured such that it includes performance information supply agents 32a and 32b operated in the guest OS's 31a and 31b to obtain performance information of the guest OS's 31a and 31b, and a performance monitoring agent 32 operated in the monitoring agent computer 60 to collect pieces of monitoring information from the monitoring information supply module 35. With this configuration, pieces of the collected information are stored in a monitoring information storage module 40 of each computer. The monitoring information management module 38 returns the stored monitoring information in response to a request from the performance monitoring manager 48. In the performance monitoring manager 48, a monitoring information management module 47 executes a process of correlating monitoring information of the guest OS 31 with that of the virtual computer 43, and a process of correlating monitoring information between the virtual computers 43 or between the guest OS's 31 based on the returned information. Then, the performance monitoring manager 48 returns the correlated monitoring information to the operation management terminal 52.

Next, a fourth embodiment of this invention will be described.

Figure 7:
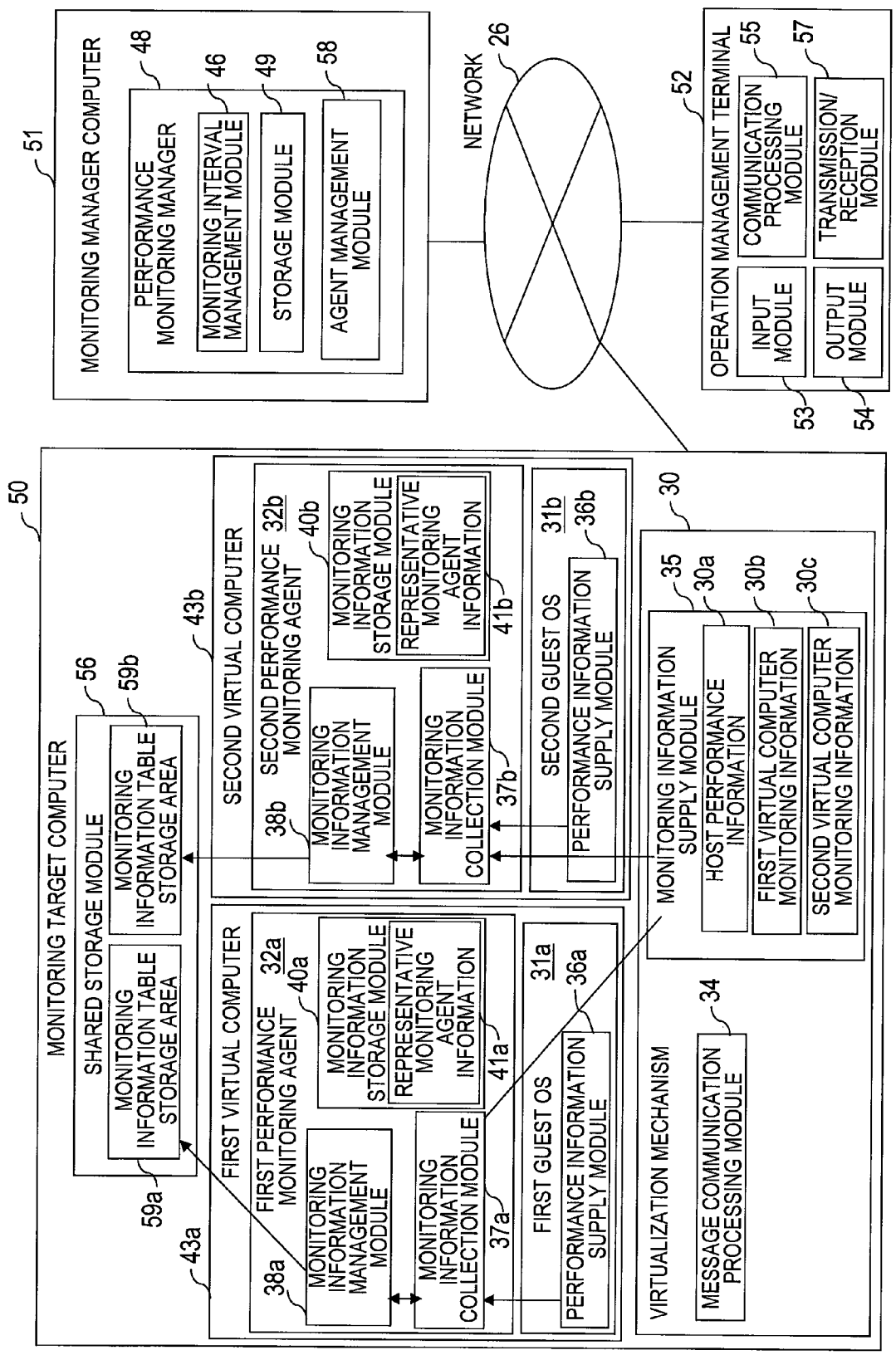
FIG. 7 is a functional block diagram showing a configuration of an information processing system according to a fourth embodiment of this invention.

FIG. 7 is a functional block diagram showing a configuration of an information processing system according to the fourth embodiment of this invention.

According to the fourth embodiment of this invention shown in FIG. 7, as in the case of the first embodiment of this invention shown in FIG. 1, a performance monitoring agent 32 operates on each guest OS 31. According to this embodiment, one of the plurality of performance monitoring agents 32 is designated as a representative monitoring agent to represent the performance monitoring agents 32. In an example of FIG. 7, a first performance monitoring agent 32a is a representative monitoring agent. Only the representative monitoring agent stores monitoring information obtained from the virtualization mechanism 30. As a result, overlapped holding of monitoring information of the same virtualization mechanism 30 by the performance monitoring agents 32 can be prevented.

The configuration of the information processing system of the fourth embodiment of this invention will be described below. However, differences will be described while description of the components similar to those of the information processing system of the first embodiment of this invention is omitted.

Monitoring information storage modules 40a and 40b include representative monitoring agent information 41a and 41b, a virtual computer guest OS correspondence table storage area (not shown), a performance monitoring agent guest OS correspondence table storage area (not shown), a threshold value table storage area (not shown), and monitoring interval information (not shown).

The representative monitoring agent information 41a and 41b are pieces of information for judging which of the performance monitoring agents 32 is a representative monitoring agent. For example, in the representative monitoring agent information 41a and 41b, identifier information of the performance monitoring agent 32 which is a representative monitoring agent is stored. For example, as shown in FIG. 7, when a first performance monitoring agent 32a is a representative monitoring agent, the monitoring information storage modules 40a and 40b store an identifier "Agt 1" of the first performance monitoring agent 32a as the representative monitoring agent information 41a and 41b.

In the virtual computer guest OS correspondence table storage area, information for correlating the guest OS 31 with the virtual computer 43 is stored. Specifically, for example, in the virtual computer guest OS correspondence table storage area, a virtual computer guest OS correspondence table 702 is stored (refer to FIG. 3A).

In the performance monitoring agent guest OS correspondence table storage area, information for correlating the guest OS 31 with a performance monitoring agent 32 operated in the guest OS 31 is stored. Specifically, for example, in the performance monitoring agent guest OS correspondence table storage area, a performance monitoring agent guest OS correspondence table 701 is stored (refer to FIG. 3B).

In the threshold value table storage area, information regarding a threshold value for judging a load situation of the virtual computer is stored. For example, in the threshold value table storage area, a threshold value table 703 shown in FIG. 8 is stored.

FIG. 8 is an explanatory diagram of the threshold value table 703 according to the fourth embodiment of this invention.

As shown, the threshold value table 703 includes a number section 703a, a virtual computer name section 703b, a resource name section 703c, and a judgment condition section 703d.

In the number section 703a, a number for identifying each line (i.e., each record) of the threshold value table 703 is stored.

In the virtual computer name section 703b, a name set in the virtual computer 43 is stored.

In the resource name section 703c, an identifier of a virtual resource constituting the virtual computer 43 is stored.

In the judgment condition section 703d, a monitoring information name and a conditional equation of monitoring information corresponding to the monitoring information name are stored. The conditional equation is used for judging a high load of the virtual computer when the monitoring information satisfies the conditional equation.

Any conditions may be stored in the judgment condition section 703d. Typically, a conditional equation for judging whether a set value given to a resource or a performance value measured in the resource exceeds a predetermined threshold value is stored in the judgment condition section 703d. In place of judging whether the set value or the performance value exceeds the threshold value, whether the set value or the performance value is below the predetermined threshold value, whether it is equal to the predetermined value, or whether it is within a predetermined range may be judged. For example, if a load of the virtual computer is judged to be higher as the set value or the performance value is lower, whether the set value or the performance value is below the predetermined threshold value may be judged. The set value or the performance value compared with the threshold value is, for example, a CPU allocation rate, a CPU allocation request rate, a CPU usage rate, a memory allocation rate, or a memory usage rate.

In the example of FIG. 8, "VM 1," "vCPU 1," and "CPU ALLOCATION RATE>80%" are stored in the virtual computer name section 703b, the resource name section 703c, and the judgment condition section 703d of a record in which "1" is stored in the number section 703a, respectively. This means that when an allocation rate of the virtual computer 43 identified by "VM 1" with respect to a resource (e.g., virtual CPU) identified by "vCPU 1" exceeds 80%, a load of the resource is judged to be high.

In the monitoring interval information, a time interval at which the performance monitoring agents 32a and 32b collect performance information and monitoring information from the monitoring information supply module 35 and the performance information supply modules 36a and 36b is recorded. The monitoring information collection module 37a and 37b collect the performance information and the monitoring information at the monitoring interval recorded in the monitoring interval information.

According to this embodiment, the information processing system includes a shared storage module 56 shared by the first and second virtual computers 43a and 43b.

For example, the first and second virtual computers 43a and 43b may share a disk. Such disk sharing can be realized by configuring a virtual disk device (not shown) and mounting the virtual disk device from the first and second virtual computers 43a and 43b. The virtual disk device is, for example, a virtual storage device which includes several storage areas of an external storage system 25.

The shared storage module 56 includes monitoring information table storage areas 59a and 59b. The monitoring information table storage areas 59a and 59b are areas for storing monitoring information obtained from the virtualization mechanism 30. The monitoring information is obtained from the virtualization mechanism 30 by the monitoring information management modules 38a and 38b, and stored in the monitoring information table storage areas 59a and 59b by the monitoring information management modules 38a and 38b. Permission to write information in the monitoring information table storage area 59a is given only to the monitoring information management module 38a. Permission to write information in the monitoring information table storage area 59b is given only to the monitoring information management module 38b. Permission to read information from the monitoring information table storage areas 59a and 59b is given to all the monitoring information management modules 38.

For example, the monitoring information table storage area 59a is an area for the first performance monitoring agent 32a. The first performance monitoring agent 32a can execute reading from the monitoring information table storage area 59a and writing in the monitoring information table storage area 59a. On the other hand, the second performance monitoring agent 32b can execute only reading from the monitoring information table storage area 59a.

The monitoring information table storage area 59b is an area for the second performance monitoring agent 32b. The second performance monitoring agent 32b can execute reading from the monitoring information table storage area 59b and writing in the monitoring information table storage area 59b. On the other hand, the first performance monitoring agent 32a can execute only reading from the monitoring information table storage area 59b.

In at least one of the monitoring information table storage areas 59a and 59b, for example, a monitoring information table 300 as shown in FIG. 3C is stored.

Information indicating a reference destination of the shared storage module 56, information indicating a reference destination of the monitoring information table storage areas 59a and 59b, and information indicating a reference destination of the monitoring information table 300 are stored by the monitoring information management modules 38a and 38b.

The performance information obtained from the performance information supply modules 36a and 36b may be stored in the monitoring information table storage areas 59a and 59b of the shared storage module 56, or in the monitoring information storage modules 40a and 40b.

Next, a processing operation of the information processing system of the fourth embodiment of this invention will be described.

Figure 9A:
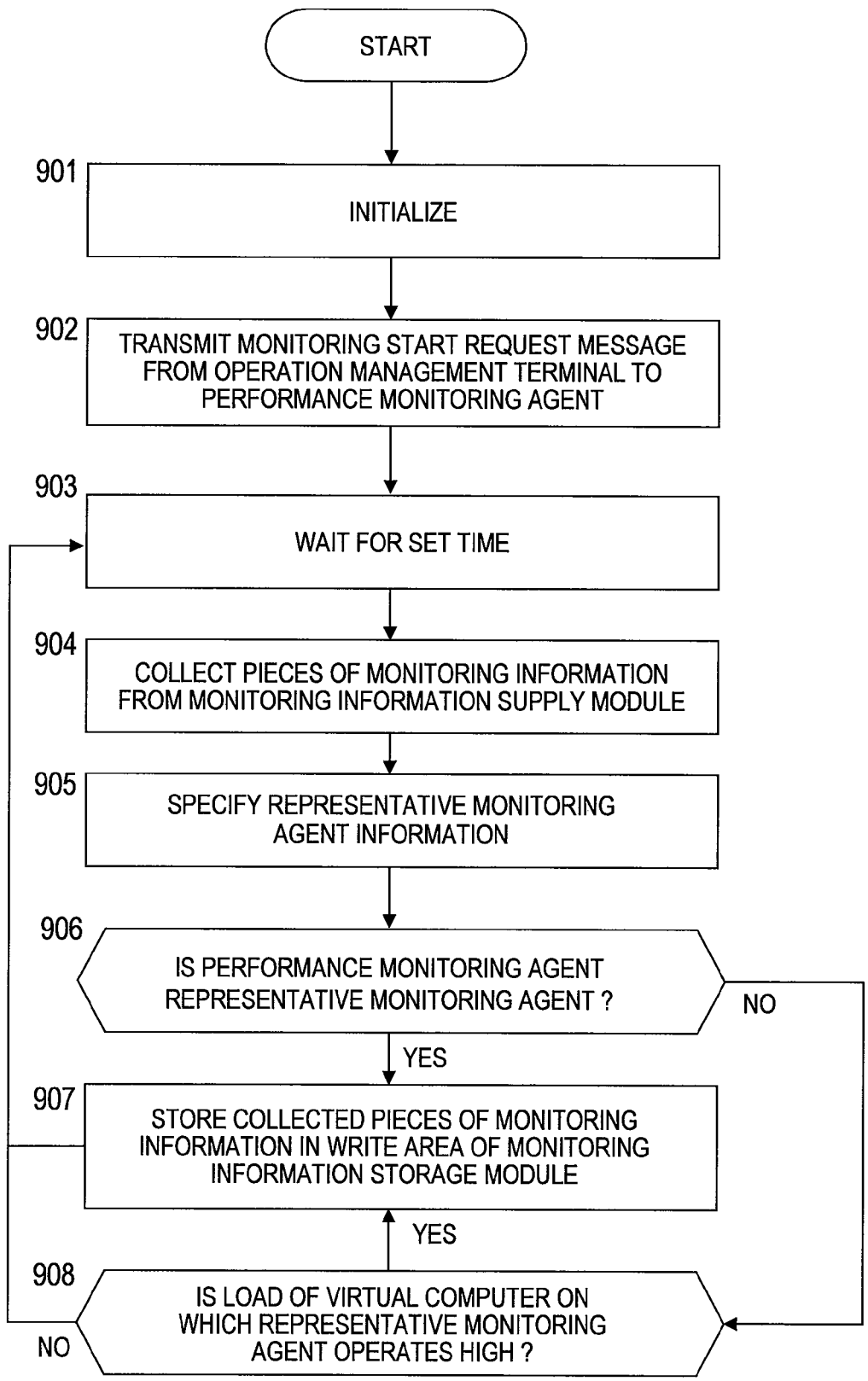
FIG. 9A is a flowchart showing a process of collecting pieces of performance information and a process of storing the collected pieces of information in the shared storage module by the information processing system of the fourth embodiment of this invention.

FIG. 9A is a flowchart showing a process of collecting pieces of performance information and a process of storing the collected pieces of information in the shared storage module 56 by the information processing system of the fourth embodiment of this invention.

(1) First, an operator of the information processing system executes initialization (step 901).

Initially, for example, the operator of the information processing system calls the monitoring information management module 38 of the performance monitoring agent 32 via the performance monitoring manager 48 by using the operation management terminal 52 to store identifier information of a representative monitoring agent as representative monitoring agent information 41 included in the monitoring information storage module 40 of the performance monitoring agent 32. The operator stores a virtual computer guest OS correspondence table 702 in the virtual computer guest OS correspondence table storage area. The operator stores a performance monitoring agent guest OS correspondence table 701 in the performance monitoring agent guest OS correspondence table storage area.

Those tables may be input via the operation management terminal 52 by the operator, the monitoring information management module 38 of the performance monitoring agent 32 may call the monitoring information management module 47 of the performance monitoring manager 48 to obtain similar tables, or an external configuration management server (not shown) for managing information of contents written in tables may be called, and tables may be automatically created based on the contents obtained from the configuration management server.

Initially, for example, the operator of the information processing system calls the monitoring information management module 38 of the performance monitoring agent 32 via the performance monitoring manager 48 by using the operation management terminal 52 to store a threshold value table 703 as shown in FIG. 8 in the monitoring information storage module 40 of the performance monitoring agent 32.

The operator of the information processing system can input proper information to be registered in the threshold value table 703 via the input module 53 of the operation management terminal 52.

(2) Next, the operator of the information processing system uses the operation management terminal 52 to transmit a monitoring start request message of performance information to the performance monitoring agent 32 via the performance monitoring manager 48 by using the operation management terminal 52 (step 902).

(3) The monitoring information collection module 37 of the performance monitoring agent 32 that has received the monitoring start request message periodically collects pieces of monitoring information, and calls the monitoring information management module 38 to store the collected pieces of monitoring information in the shared storage module 56 (steps 903 to 908). The periodically collected pieces of monitoring information are, for example, host performance information 30a supplied from the monitoring information supply module 35 of the virtualization mechanism 30, first virtual computer monitoring information 30b, second virtual computer monitoring information 30c, and performance information of each guest OS 31 supplied from the performance information supply module 36 of the guest OS 31.

The process of those steps is repeatedly executed until the operator of the information processing system uses the operation management terminal 52 to transmit a monitoring end message to the performance monitoring agent 32 via the performance monitoring agent 48, and the performance monitoring agent receives the message.

The process of those steps will be described in detail. A process of collecting pieces of monitoring information from the monitoring information supply module 35 and storing the collected pieces of monitoring information will be described.

(4) First, the monitoring information collection module 37a waits for set monitoring interval time from the time of obtaining the last monitoring information (step 903). Then, the monitoring information collection module 37a obtains host performance information 30a, first virtual computer monitoring information 30b, and second virtual computer monitoring information 30c from the monitoring information supply module 35 (step 904). The first virtual computer monitoring information 30b and the second virtual computer monitoring information 30c contain virtual computer resource allocation information, virtual computer configuration information, and virtual computer performance information regarding the first and second virtual computers 43a and 43b. In this step, information regarding all the virtual computers 43 operated in the monitoring target computer 50 is obtained.

(5) The monitoring information management module 38 refers to the representative monitoring agent information 41 to specify a representative monitoring agent (step 905). The monitoring information management module 38 judges whether the performance monitoring agent 32 to which the monitoring information management module 38 belongs is a representative monitoring agent (step 906).

(6) Hereinafter, as an example, a case where the first performance monitoring agent 32a is a representative monitoring agent will be described. In this case, in a step 906, the monitoring information management module 38a judges that the first performance monitoring agent 32a to which the monitoring information management module 38a belongs is a representative monitoring agent. In this case, the monitoring information management module 38a correlates the host performance information 30a, the first virtual computer monitoring information 30b, and the second virtual computer monitoring information 30c which have been obtained with the time of obtaining those pieces of information to store them in the storage area for the first performance monitoring agent 32a of the shared storage module 56 (i.e., monitoring information table storage area 59a) (step 907).

(7) On the other hand, in the step 906, the monitoring information management module 38b judges that the second performance monitoring agent 32b to which the monitoring information management module 38b belongs is not a representative monitoring agent. In this case, the monitoring information management module 38b of the second performance monitoring agent 32b refers to the representative agent information 41b to obtain an identifier of the first performance monitoring agent 32a which is a representative monitoring agent. The monitoring information management module 38b specifies information indicating performance of the representative monitoring agent among the pieces of information obtained in the step 904 based on the obtained identifier. The monitoring information management module 38b judges whether a load of the first virtualization computer 43a in which the representative monitoring agent operates is high based on the specified information (step 908). The judgment as to whether the load of the representative monitoring agent is high (i.e., whether a load of the virtual computer 43 in which the representative monitoring agent operates is high) will be described below referring to a flowchart of FIG. 9C.

(8) If it is judged in the step 908 that the load of the first virtual computer 43a is high, it is considered that a failure may have occurred in the first virtual computer 43a or a related part. In this case, the monitoring information management module 38b of the second performance monitoring agent 32b correlates the host performance information 30a, the first virtual computer monitoring information 30b, and the second virtual computer monitoring information 30c which have been obtained with the time of obtaining those pieces of information to store them in the storage area for the second performance monitoring agent 32b of the shared storage module 56 (i.e., monitoring information table storage area 59b) (step 907). Then, the process returns to the step 903.

(9) If it is judged in the step 908 that the load of the first virtual computer 43a is not high, it is considered that no failure has occurred in the first virtual computer 43a or a related part. In this case, the monitoring information management module 38b of the second performance monitoring agent 32b returns to the step 903 without storing the obtained information in the shared storage module 56.

In the flowchart, in the case of storing the information obtained from the performance information supply modules 36a and 36b in the shared storage module 56, performance information is obtained from the performance information supply modules 36a and 36b in the step 904. In the step 907, the performance information is stored in the storage area for each performance monitoring agent 32 of the shared storage module 56.

Figure 9B:
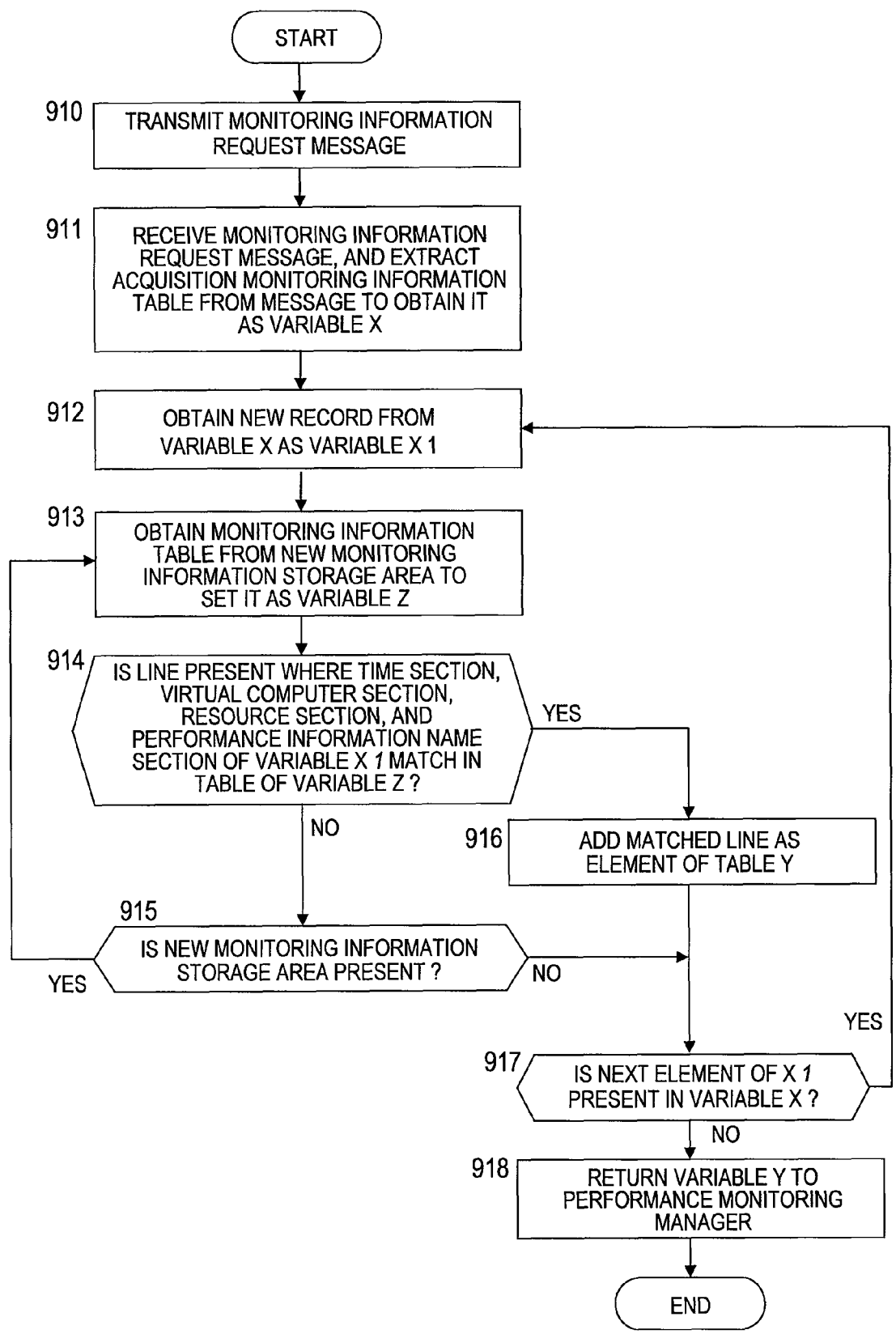
FIG. 9B is a flowchart showing a process of reading collected and stored pieces of monitoring information from a monitoring information collection module by the performance monitoring agent, and a process of displaying the monitoring information in the operation management terminal according to the fourth embodiment of this invention.

FIG. 9B is a flowchart showing a process of reading the collected and stored pieces of monitoring information from the monitoring information collection module 37 by the performance monitoring agent 32, and a process of displaying the monitoring information in the operation management terminal 52 according to the fourth embodiment of this invention.

(1) The operator of the information processing system instructs the operation management terminal 52 to transmit a monitoring information request message to the monitoring information management module 38 of the performance monitoring agent 32. This instruction is input to the operation management terminal 52 by using the input module 53. The operation management terminal 52 transmits the monitoring information request message to the monitoring information management module 38 of the performance monitoring agent 32 via the performance monitoring manager 48 according to operator's instruction (step 910).

The monitoring information request message contains an acquisition monitoring information table (not shown). In the acquisition monitoring information table, information for designating monitoring information requested to be obtained by the operator is stored.

For example, the acquisition monitoring information table includes a time section, a virtual computer name section, a resource name section, and a performance information name section. As in the case of the monitoring information table 300, time is stored in the time section, a virtual computer name is stored in the virtual computer name section, a resource name is stored in the resource name section, and a monitoring information name is stored in the monitoring information name section. Based on values of those sections, monitoring information requested to be obtained by the operator is designated. As in the case of the monitoring information table 300, one set of those sections is equivalent to one record.

(2) The monitoring information management module 38 of the performance monitoring agent 32 receives a performance information request message from the operation management terminal 52. The monitoring information management modules 38a and 38b of the performance monitoring agents 32a and 32b extract the acquisition monitoring information table from the received performance information request message, and obtain the extracted acquisition monitoring information table as a variable X (step 911).

(3) The monitoring information management module 38 of the performance monitoring agent 32 obtains a first element of the variable X as a variable X1 (step 912). One element of the variable X is equivalent to one record of the acquisition monitoring information table obtained as the variable X.

(4) The monitoring information management modules 38a and 38b load the shared storage module 56 to select one from the monitoring information table storage areas 59, and obtains the monitoring information table 300 stored in the selected monitoring information table storage area 59 as a variable Z (step 913).

In the step 913, one is selected from the monitoring information table storage areas 59 stored by the performance monitoring agent 32 operated in the virtual computer of one monitoring target computer 50.

(6) The monitoring information management module 38 of the performance monitoring agent 32 searches the monitoring information table 300 obtained as the variable Z to judge the presence of a record where the time section 300a, the virtual computer name section 300b, the resource name section 300c, and the monitoring information name section 300d of the monitoring information table 300 match the time, the virtual computer name, the resource name, and the monitoring information name of the variable X1, respectively (step 914). If a matched record is present, the monitoring information management module 38 of the performance monitoring agent 32 obtains the record as a variable Y1.

In other words, for example, the monitoring information management module 38a of the first performance monitoring agent 32a loads the shared storage module 56 to sequentially read the monitoring information tables 300 from the monitoring information table storage areas 59a and 59b. Then, the monitoring information management module 38a searches the read monitoring information table 300 to obtain a record matched with the variable X1. When the record matched with the variable X1 is found, the monitoring information management module 38a may finish searching with respect to the variable Y1, or search all the monitoring information tables 300.

The monitoring information management module 38a may find a plurality of records matched with the variable X1 as a result of searching all the monitoring information tables 300. For example, when there are a plurality of virtual computers 43 in which performance monitoring agents 32 that are not representative operate, upon judgment that a load of the virtual computer 43 in which a representative agent operates is high, the plurality of performance monitoring agents 32 store the same monitoring information obtained from the virtualization mechanism 30 in the shared storage module 56. In this case, a plurality of records matched with the variable X1 are found. In such a case, the monitoring information management module 38a may obtain only one of the plurality of found records to discard the rest.

By targeting for searching, not only the pieces of monitoring information tables 300 collected by the representative monitoring agent (e.g., first performance monitoring agent 32a) but also the monitoring information tables 300 collected by the performance monitoring agent (e.g., second performance monitoring agent 32b) which is not a representative monitoring agent, monitoring information which the representative monitoring agent has failed to obtain can be obtained.

(7) If a record matched with the variable X1 is found in the step 914, the monitoring information management module 38 adds the variable Y1 as an element to a response performance information table Y (step 916).

(8) Next, the monitoring information management module 38 judges whether a next element of the variable X1 is present in the variable X (step 917). If a next element of the variable X1 is present in the variable X, the monitoring information management module 38 obtains the next element of the variable X1 from the variable X as a new variable X1 (step 912). Thereafter, the monitoring information management module 38 executes the process of the step 913 and the subsequent steps for the new variable X1.

(9) On the other hand, if a next element of the variable X1 is not present in the variable X, the monitoring information management module 38 returns contents of the obtained variable Y to the operation management terminal 52 via the performance monitoring manager 48 (step 918).

In the variable Y, among the records of the monitoring information table 300, a record containing a value of monitoring information specified by the acquisition monitoring information table is stored. For example, the variable Y may contain a line regarding monitoring information which the representative monitoring agent has stored in the monitoring information table 300, and a line regarding monitoring information which the representative monitoring agent has failed to store in the monitoring information table 300 but the performance monitoring agent 32 that is not a representative monitoring agent has stored.

(10) If no record matched with the variable X1 is found in the step 914, whether a new monitoring information table storage area 59 which becomes a next search target in the step 913 is judged (step 915). If a new monitoring information table storage area 59 which becomes a next search target is present, the process returns to the step 913. If a new monitoring information table storage area 59 which becomes a next search target is not present, the process proceeds to a step 917.

Figure 9C:
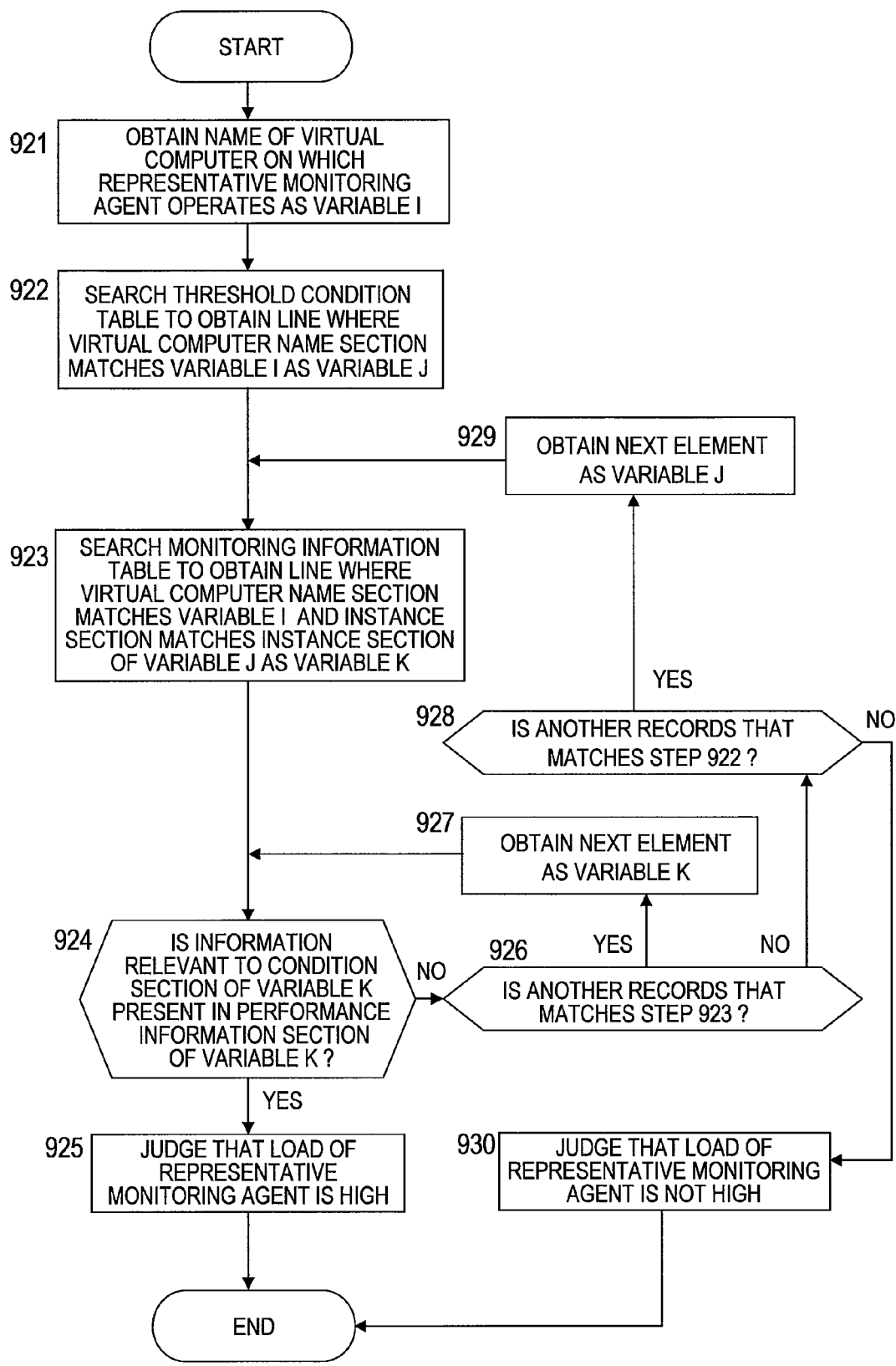
FIG. 9C is a flowchart showing a process executed to judge whether a load of a virtual computer in which a representative monitoring agent operates is high according to the fourth embodiment of this invention.

FIG. 9C is a flowchart showing a process executed to judge whether a load of the virtual computer 43 in which the representative monitoring agent operates is high according to the fourth embodiment of this invention.

As an example, FIG. 9C shows a process where the monitoring information management module 38b of the performance monitoring agent 32b which is not a representative monitoring agent judges whether a load of the virtual computer 43a in which the performance monitoring agent 32a that is a representative monitoring agent operates is high.

(1) The monitoring information management module 38b loads the monitoring information storage module 40b to obtain a name of the virtual computer 43 in which the representative monitoring agent 32 operates as a variable/(step 921).

Specifically, the monitoring information management module 38b reads the representative monitoring agent information 41b, and obtains a virtual computer name from the performance monitoring agent guest OS correspondence table 701 and the virtual computer guest OS correspondence table 702.

(2) The monitoring information management module 38b searches the threshold value table 703 to obtain a record in which the virtual computer name section 703b matches the variable I as a variable J (step 922).

(3) The monitoring information management module 38b searches the monitoring information table 300 to obtain a record in which the virtual computer name section 300b matches the variable I, and the resource name section 300c matches the resource name section 703c of the variable J as a variable K (step 923).

(4) The monitoring information management module 38b judges whether the monitoring information name section 300d and the monitoring information value section 300d of the variable J satisfy conditions stored in the judgment condition section 703d of the variable K (step 924).

(5) If a result of the judgment of the step 924 shows that there is a variable J which satisfies the conditions of the variable K, the monitoring information management module 38b judges that a load of the virtual computer 43 in which the representative monitoring agent operates is high to finish the process (step 925).

(6) If a result of the judgment of the step 924 shows that there is no variable J which satisfies the conditions of the variable K, the monitoring information management module 38b judges whether there are more records that matches the search condition of the step 923 (step 926).

(7) If a result of the judgment of the step 926 shows that there is a record that matches the search condition, the monitoring information management module 38b obtains the record as a new variable K (step 927). Then, for the new variable K, judgment of the step 924 is executed. In the threshold value table 703, a plurality of judgment conditions may be set for one resource. In such a case, by executing a loop of the steps 924, 926, and 927, when at least one of the plurality of judgment conditions is satisfied, a load of the virtual computer 43 is judged to be high.

(8) If a result of the judgment of the step 926 shows that there is no record that matches the search condition, the monitoring information management module 38b judges whether there are more records that matches the search condition of the step 922 (step 928).

(9) If a result of the judgment of the step 928 shows that there is a record that matches the search condition, the monitoring information management module 38b obtains the record as a new variable J (step 929). Then, for the new variable J, the process of the step 923 and the subsequent steps are executed. In the threshold value table 703, judgment conditions may be set for a plurality of resources of one virtual computer 43. In such a case, by executing a loop of the steps 923 to 929, when at least one judgment condition of the plurality of resources is satisfied, a load of the virtual computer 43 is judged to be high.

(10) If a result of the judgment of the step 928 shows that there is no record that matches the search condition, the monitoring information management module 38b judges that a load of the virtual computer 43 in which the representative monitoring agent operates is not high to finish the process (step 930).

Figure 9D:
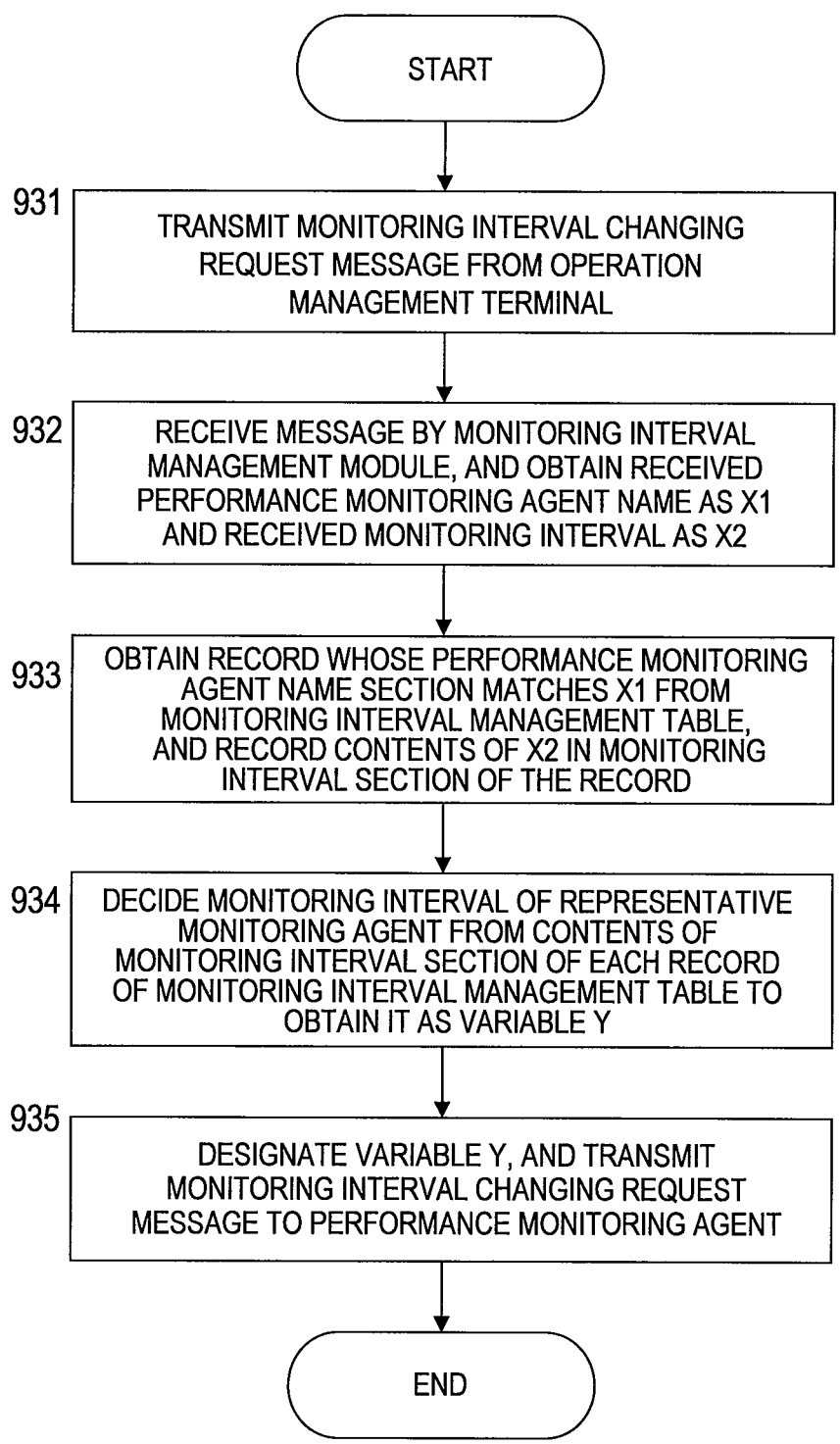
FIG. 9D is a flowchart showing a process when an operator changes a monitoring interval of performance information according to the fourth embodiment of this invention.

FIG. 9D is a flowchart showing a process when the operator changes a monitoring interval of performance information according to the fourth embodiment of this invention.

In this case a process where the operator changes an interval of collecting pieces of monitoring information by the monitoring information supply module 35 will be described. Monitoring interval information contains information indicating an interval of collecting pieces of monitoring information from the monitoring information supply module 35.

(1) When the operator operates the input section 53 of the operation management terminal 52 to change a monitoring interval of performance information by a certain performance monitoring agent, the operation management terminal 52 transmits a monitoring interval change request message designating a performance monitoring agent 32 to be changed and a new monitoring interval to the performance monitoring manager 48 (step 931).

(2) The monitoring interval management module 46 of the performance monitoring manager 48 receives the monitoring interval change request message. Then the monitoring interval management module 46 obtains a new monitoring interval designated by the monitoring interval change request message as a variable X1 (step 932). Further, the monitoring interval management module 46 obtains a performance monitoring agent 32 designated by the monitoring interval change request message as a variable X2.

(3) The monitoring interval management module 46 of the performance monitoring manager 48 loads the storage module 49 to read a monitoring interval management table (not shown).

The monitoring interval management table includes a performance monitoring agent section (not shown) and a monitoring interval section (not shown). In the performance monitoring agent section, an identifier of the performance monitoring agent 32 is stored. In the monitoring interval section, information indicating a time interval at which the performance monitoring agent 32 identified by an identifier of the performance monitoring agent section obtains performance information is stored.

The monitoring interval management module 46 obtains a record in which a performance monitoring agent section matches contents of the variable X2 as a variable A from the monitoring interval management table. Then, the monitoring interval management module 46 stores contents of the variable X1 in the monitoring interval section of the variable A (step 933).

(4) The monitoring interval management module 46 decides a new monitoring interval of a representative monitoring agent based on the contents of the variable X1 and monitoring interval information stored in each record of the monitoring interval management table, and obtains the decided monitoring interval as a variable Y (step 934).

In this case, the variable Y is decided so that information acquisition timing of the representative monitoring agent can include information acquisition timing of the performance monitoring agents 32a and 32b.

For example, the monitoring interval management module 46 reads a value of the monitoring interval section stored in each record of the monitoring interval management table, and sets a greatest common factor of the values as a variable Y. In other words, records where identifiers of the performance monitoring agents 32a and 32b are stored in the performance monitoring agent section are read from the monitoring interval management table to obtain a greatest common factor of contents stored in the monitoring interval sections of the records. For example, when "30 minutes" and "20 minutes" are stored, "10 minutes" which is a greatest common factor thereof becomes a monitoring interval of the representative monitoring agent.

For example, both monitoring intervals of the performance monitoring agents 32a and 32b can be decided as variables Y. In other words, when monitoring intervals of the performance monitoring agents 32a and 32b are set to 30 minutes and 20 minutes, respectively, 30 minutes and 20 minutes both become monitoring intervals of the representative agent. In this case, the representative monitoring agent obtains performance information at an interval of 30 minutes and also at an interval of 20 minutes.

(5) The monitoring interval management module 46 of the performance monitoring manager 48 transmits a monitoring interval changing message for designating contents of the variable Y to the monitoring information collection modules 37a and 37b of the performance monitoring agents 32a and 32b (step 935).

The monitoring information collection modules 37a and 37b receive the monitoring interval changing message. Then the monitoring information collection modules 37a and 37b extract monitoring interval information from the variable Y designated by the monitoring interval changing message, and stores the extracted monitoring information in the monitoring information storage modules 40a and 40b.

Thereafter, the monitoring information collection modules 37a and 37b of the performance monitoring agents 32a and 32b load the monitoring information storage modules 40a and 40b to collect pieces of monitoring information based on the monitoring interval stored as the monitoring interval information.

When performance monitoring agents 32 operate in one or more guest OS's 31, and, each performance monitoring agent 32 stores monitoring information of the virtualization mechanism 30 in the monitoring information storage module 40, the monitoring target computer 50 holds the same monitoring information in an overlapped manner. As a result, a storage area (e.g., memory 22 or external storage system 25) installed in the monitoring target computer 50 is wasted. According to the fourth embodiment of this invention, however, by storing performance information in the shared storage module 56 only by one performance monitoring agent 32 representing the plurality of performance monitoring agents 32, the amount of data stored in the performance monitoring agent can be reduced.

When a load of the virtual computer 43 in which the representative monitoring agent operates is high, it may be difficult to obtain monitoring information of the virtualization mechanism 30 and to store it in the shared storage module 56. According to the fourth embodiment of this invention, however, when a load of the virtual computer 43 in which the representative monitoring agent operates is high, by storing the monitoring information in the shared storage module 56 by the performance monitoring agent 32 which is not a representative monitoring agent, failure to collect monitoring information of the virtualization mechanism 30 can be prevented.

By receiving a heartbeat signal from the representative monitoring agent by the performance monitoring manager 48, or periodically checking whether the representative monitoring agent is operating or not by the performance monitoring manager 48, monitoring information acquisition failure of the representative monitoring agent may be detected to replace the representative monitoring agent. In this case, however, because it takes time for the performance monitoring manager 48 to detect a collection inhibited situation after the representative monitoring agent is inhibited to collect pieces of monitoring information, no monitoring information can be collected during this period. According to the fourth embodiment of this invention, when a load of the virtual computer in which the representative monitoring agent operates is high, without waiting for detection by the performance monitoring manager 48, each performance monitoring agent 32 stores the monitoring information in the shared storage module 56. Thus, collection leak of monitoring information by the representative monitoring information can be reduced.

Further, according to the fourth embodiment of this invention, as long as information not obtained by the representative monitoring agent due to a high load of the virtual computer is collected by the other performance monitoring agent 32, information obtained by the representative monitoring agent can be supplemented by this information to be displayed in the operation management terminal 52.

Next, a fifth embodiment of this invention will be described.

A functional block diagram of an information processing system of the fifth embodiment of this invention is similar to that of the fourth embodiment of this invention (refer to FIG. 7). According to the fifth embodiment of this invention, in the information processing system similar to that of the fourth embodiment of this invention, when a load of a representative monitoring agent is continuously high, a process of replacing the representative monitoring agent is executed.

A configuration of the information processing system of the fifth embodiment of this invention will be described referring to FIG. 7. Differences will be described while components similar to those of the information processing system of the fourth embodiment of this invention will be omitted.

In addition to the functions of the fourth embodiment of this invention, monitoring information management modules 38a and 38b include functions of detecting that a load of a virtual computer 43 in which a representative monitoring agent operates is continuously high, and notifying an alternative candidate of the representative monitoring agent to a performance monitoring manager 48.

Monitoring information storage modules 40a and 40b of a performance monitoring agent 32 include a load judgment history table storage area (not shown) and an alternative condition table storage area (not shown).

In the load judgment history table storage area, information indicating a result of judging whether a load of the virtual computer 43 in which the representative monitoring agent operates is high is stored.

In the load judgment history table storage area, for example, a load judgment history table 2000 shown in FIG. 10A is stored.

FIG. 10A is an explanatory diagram of the load judgment history table 2000 according to the fifth embodiment of this invention.

The load judgment history table 2000 includes a time section 2000a and a load judgment result section 2000b.

In the time section 2000a, the time of judging a load is stored.

The load judgment result section 2000b includes sections (2000c, 2000d, . . . ) corresponding to numbers stored in the number section 703a of the threshold value table 703 shown in FIG. 8. In those sections, "Y" is stored when a load of the representative monitoring agent is judged to be high, and "N" is stored when a load is judged not to be high. However, as long as whether a load is high can be judged, and a result of the judgment can be stored, the invention is not limited to this method. Judgment and storage of its result may be executed by any methods.

In the alternative condition table storage area, conditions for replacing the representative monitoring agent are stored. A condition for replacement is, for example, a continuously high load of the virtual computer 43 in which the representative monitoring agent operates. For example, when a load of the virtual computer 43 exceeds a threshold value stored in the threshold value table 703 with a certain frequency (7 times out of 10 times), it is judged that a load is continuously high.

For example, in the alternative condition table storage area, an alternative condition table 2001 as shown in FIG. 10B is stored.

FIG. 10B is an explanatory diagram of the alternative condition table 2001 according to the fifth embodiment of this invention.

The alternative condition table 2001 includes an alternative condition section 2001a.

In the alternative condition section 2001a, conditions for replacing the representative monitoring agent are stored. For example, in the alternative condition section 2001a, a number corresponding to the number section 703a of the threshold value table 703 shown in FIG. 8, and a frequency of satisfying judgment conditions of the judgment condition section 703d are stored. For example, when "(NUMBER=2) && (CONDITION=THRESHOLD VALUE IS EXCEEDED BY 5 TIMES OUT OF 7 TIMES)" is stored in the alternative condition section 2001a, among pieces of monitoring information of a resource identified by a virtual computer name "VM 2" and a resource name "vCPU 1," monitoring information recently obtained 7 times in which a monitoring information name is "CPU ALLOCATION REQUEST RATE" is referred to. Then, when monitoring information values of any 5 times exceed "5%," among monitoring information values of 7 times, it is judged that a load is continuously high.

The conditions for judging that the load is continuously high are not limited to the aforementioned conditions. For example, when a load of the virtual computer 43 continuously exceeds the threshold value by a designated number of times, it may be judged that the load is continuously high. Alternatively, when a load is judged to be high for a predetermined time, it may be judged that the load is continuously high.

The performance monitoring manager 48 includes an agent management module 58.

The agent management module 58 executes a process of managing statuses of the performance monitoring agents 32a and 32b under control of the performance monitoring manager 48. For example, when a load of the performance monitoring agent 32 is high, the agent management module 58 executes a replacement process of the representative monitoring agent.

Next, a process executed by the information processing system of the fifth embodiment of this invention will be described.

Figure 11A:
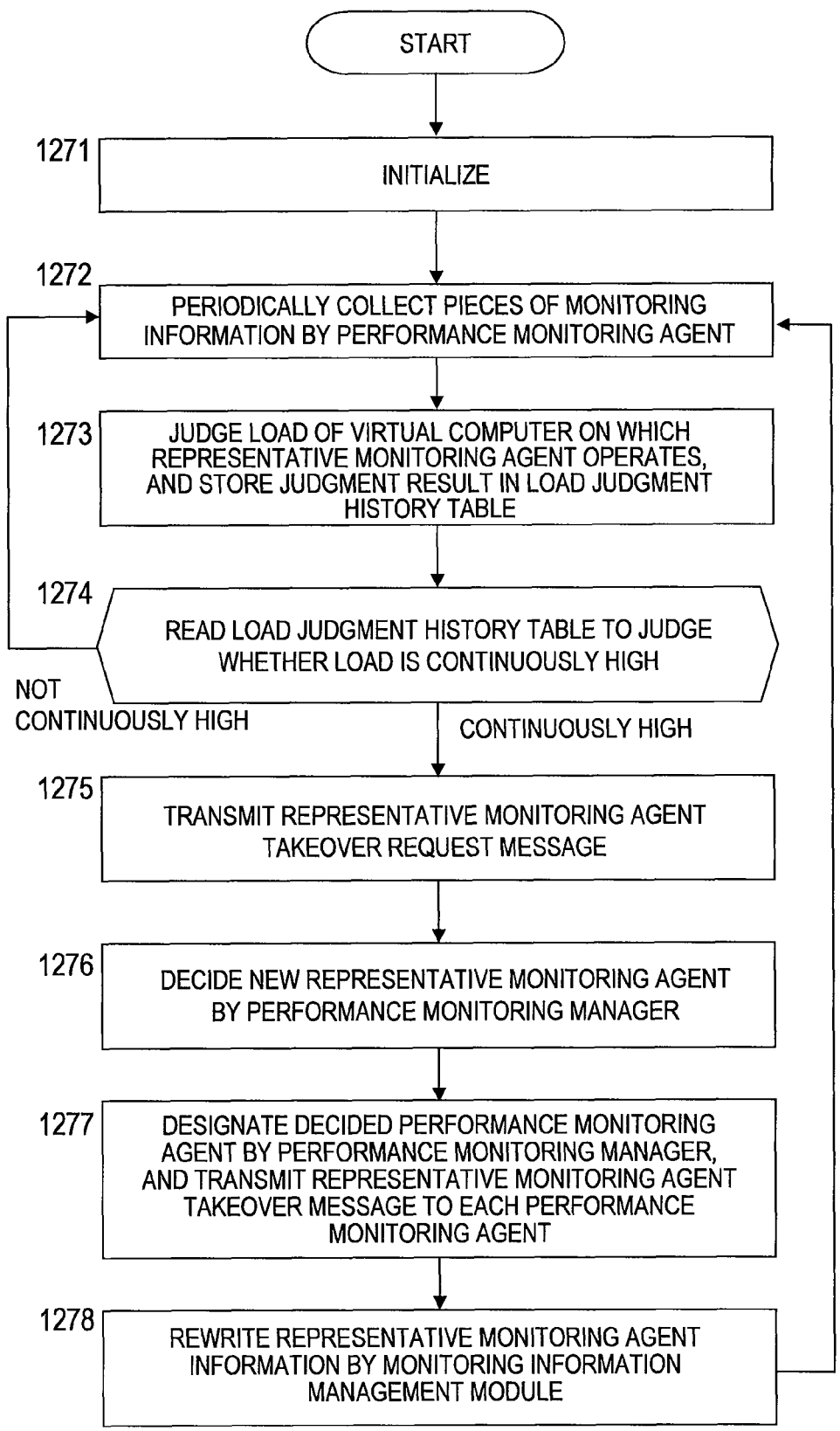
FIG. 11A is a flowchart showing an entire process executed by the information processing system of the fifth embodiment of this invention.

FIG. 11A is a flowchart showing an entire process executed by the information processing system of the fifth embodiment of this invention.

An example where the first performance monitoring agent 32a of the first virtual computer 43a is a representative monitoring agent at the time of starting the process of FIG. 11A will be described below. In other words, at time before the start of the process of FIG. 11A, the first performance monitoring agent 32a periodically obtains monitoring information from the monitoring information supply module 35 of the virtualization mechanism 30 to store the monitoring information in the shared storage module 56. On the other hand, only when a load of the first virtual computer 43a is judged to be high, the second performance monitoring agent 32b that is not a representative monitoring agent obtains monitoring information from the monitoring information supply module 35 of the virtualization mechanism 30 to store the monitoring information in the shared storage module 56.

(1) First, initialization is carried out (step 1271).

For example, the operator inputs contents of the alternative condition table 2001 and contents of the threshold value table 703 from the input module 53 of the operation management terminal 52. The communication processing module 55 of the operation management terminal 52 designates an alternative condition table 2001 and a threshold value table 703 of input targets to transmit a message containing the input contents.

The monitoring information storage modules 40a and 40b of the performance monitoring agents 32a and 32b receive the message transmitted from the operation management terminal 52 via the performance monitoring manager 48 to store contents of the alternative condition table 2001 and contents of the threshold value table 703 designated by the message in an alternative condition table storage area and a threshold value judgment table storage area of the monitoring information storage modules 40a and 40b, respectively.

At a point of this time, nothing has been stored in a load judgment history table 2000 stored in a load judgment history table storage area.

(2) The monitoring information collection module 37b of the second performance monitoring agent 32b decides a representative monitoring agent based on representative monitoring agent information 41b. Then, the monitoring information collection module 37b periodically collects pieces of monitoring information of the virtual computer 43 (i.e., first virtual computer 43a) in which the representative monitoring agent operates from the monitoring information supply module 35 (step 1272).

(3) The monitoring information management module 38b of the second performance monitoring agent 32b judges whether a load of the first virtual computer 43a is high based on the collected pieces of monitoring information, and stores a result of the judgment in the load judgment history table 2000 (step 1273).

Whether the load is high is judged based on, for example, the threshold value table 703 shown in FIG. 8 by a process shown in FIG. 9C.

For example, the monitoring information management module 38b loads records of the threshold value table 703 of FIG. 8 one by one, judges whether the load of the first virtual computer 43a satisfies a judgment condition 703d, and stores a result of the judgment in the newly added record of the load judgment history table 2000. If the load of the first virtual computer 43a satisfies the judgment condition, the monitoring information management module 38b stores "Y" in the load judgment result section 2000b of the load judgment history table 2000 corresponding to the number section 703a of the record of the threshold value table 703 in which the judgment condition has been stored. On the other hand, if the judgment condition is not satisfied, the monitoring information management module 38b stores "N" in the load judgment result section 2000b. Then, the monitoring information management module 38b stores the time of judging the load in the time section 2000a.

(4) The monitoring information management module 38b of the second performance monitoring agent 32b reads the load judgment history table 2000 to judge whether the load of the virtual computer 43 in which the representative monitoring agent operates is continuously high (step 1274). The process of judging whether the load of the virtual computer 43 in which the representative monitoring agent operates is continuously high will be described referring to FIG. 11B.

(5) If it is judged in the step 1274 that the load of the representative monitoring agent (i.e., load of the virtual computer 43 in which the representative monitoring agent operates) is continuously high, the monitoring information management module 38b transmits a representative monitoring agent replacement request message to the performance monitoring manager 48 (step 1275). The representative monitoring agent replacement request message may contain a representative monitoring agent candidate list (not shown). The representative monitoring agent candidate list is a list of candidates from which a performance monitoring agent 32 is selected as a representative monitoring agent. The representative monitoring agent candidate list contains information for identifying at least one of performance monitoring agents 32 represented by a current representative monitoring agent.

(6) The agent management module 58 of the performance monitoring manager 48 that has received the replacement request message of the step 1275 selects one of the performance monitoring agents 32a and 32b as a new representative monitoring agent (step 1276).

In this case, for example, the agent management module 58 can select a new representative monitoring agent from the candidate list of the performance monitoring agents 32 contained in the representative monitoring agent replacement request message. An example of this process will be described referring to FIG. 11C.

Figure 11B:
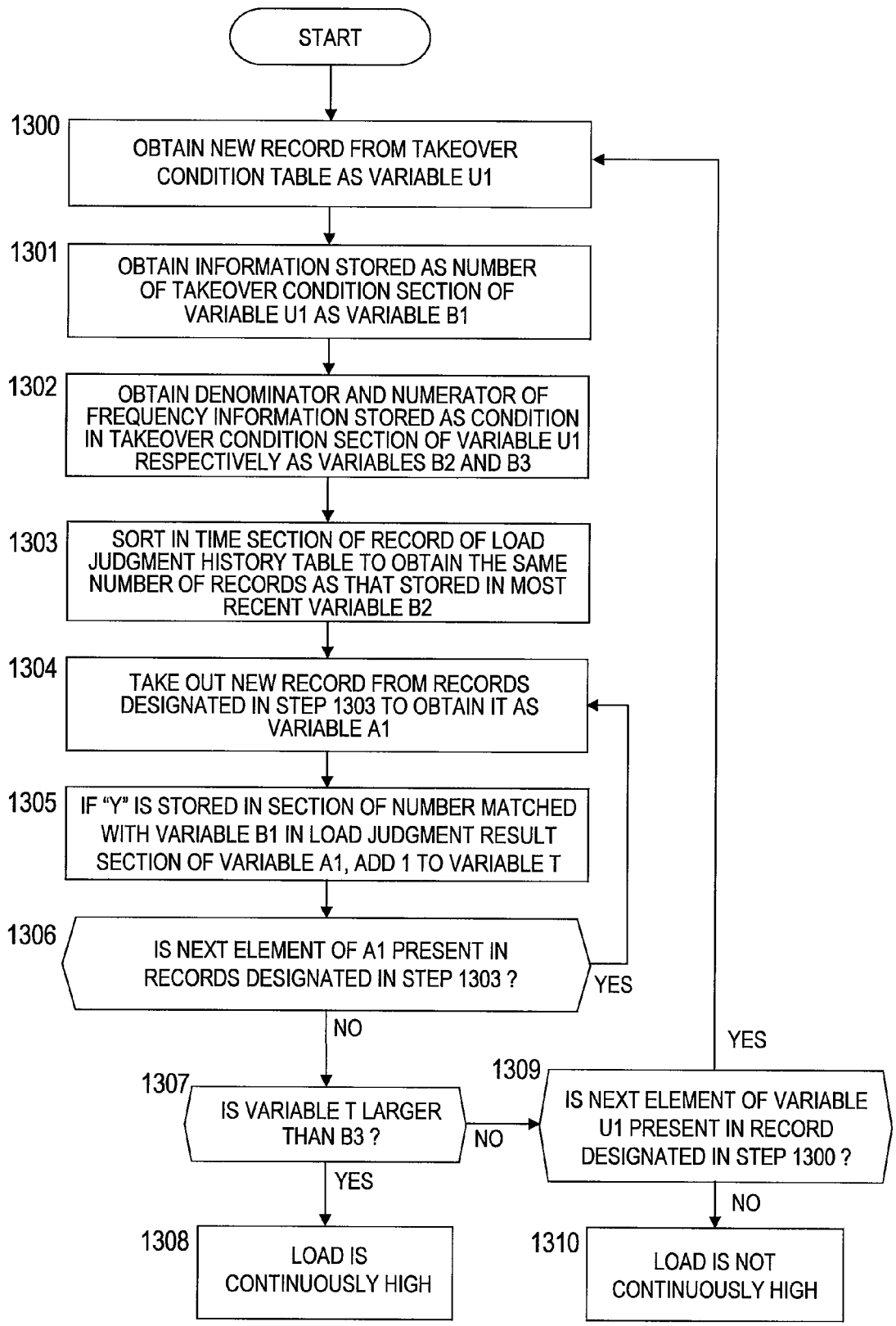
FIG. 11B is a flowchart showing a process where the monitoring information management module of the second performance monitoring agent which is not a representative monitoring agent judges whether a load of a virtual computer in which the representative monitoring agent operates is continuously high.
Figure 11C:
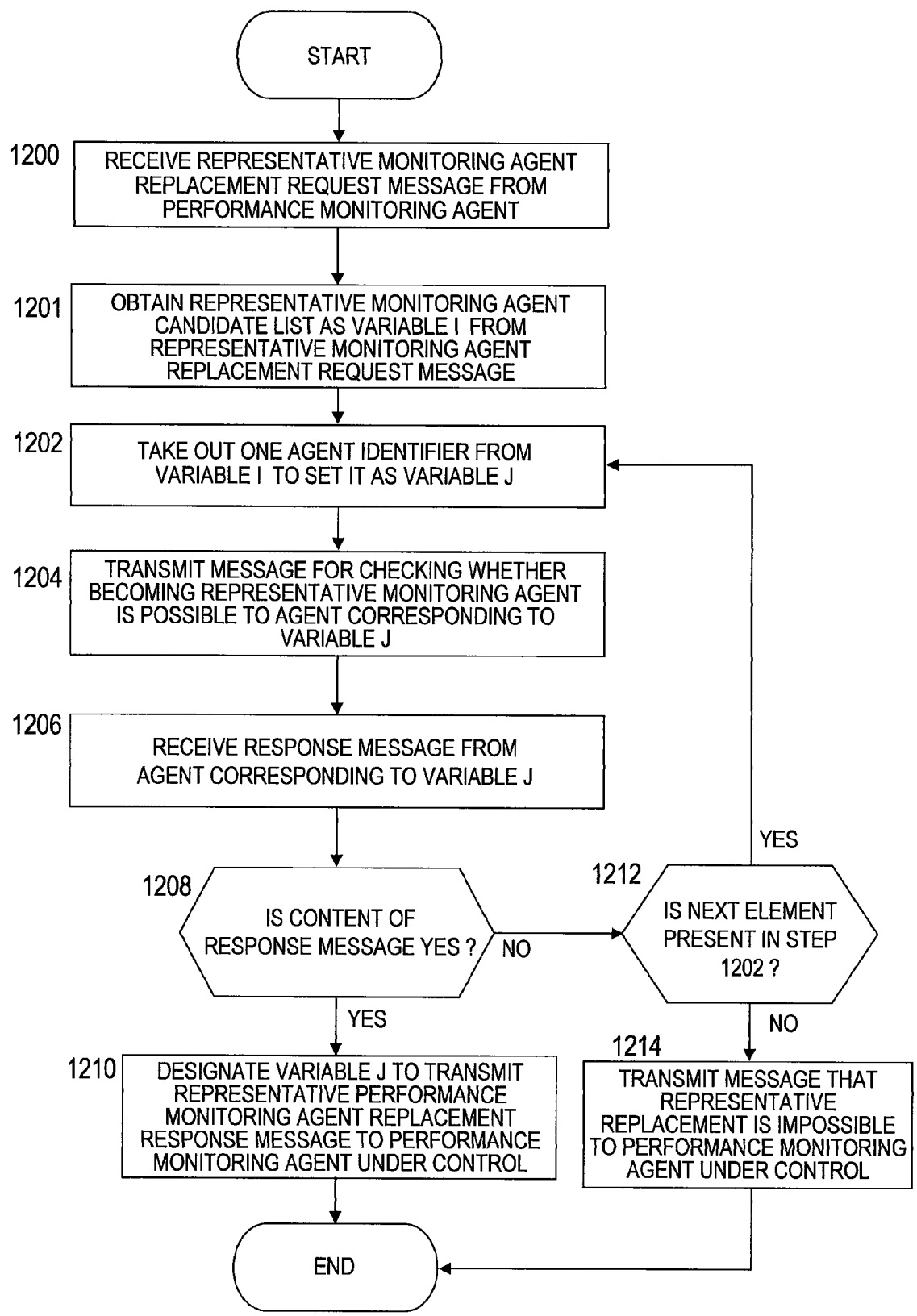
FIG. 11C is a flowchart showing a process where the performance monitoring manager of the fifth embodiment of this invention decides a new representative monitoring agent.

The method of selecting a new representative monitoring agent is not limited to the process shown in FIG. 11C. For example, a representative monitoring agent can be selected at random from the performance monitoring agents 32 other than the performance monitoring agent 32 which is a high-load representative monitoring agent.

When a new representative monitoring agent is decided, the agent management module 58 may execute a process of making an inquiry to the decided performance monitoring agent 32 about whether the decided performance monitoring agent 32 can be a representative agent.

(7) The agent management module 58 transmits a representative monitoring agent replacement message to all the performance monitoring agents 32 (second performance monitoring agents 32b in the example of FIG. 7) represented by the first performance monitoring agent 32a (step 1277). The representative monitoring agent replacement message contains information for identifying a performance monitoring agent 32 newly selected as a representative monitoring agent.

(8) The monitoring information management modules 38a and 38b of the performance monitoring agents 32a and 32b receive the representative monitoring agent replacement message. Then the monitoring information management modules 38a and 38b extract information for identifying the new representative monitoring agent from the representative monitoring agent replacement message to rewrite contents of pieces of representative monitoring agent information 41a and 41b with the extracted information (step 1278). After the rewriting, the process returns to the step 1272.

(9) If it is not judged in the step 1274 that a load of the representative monitoring agent is continuously high, the process returns to the step 1272.

As a result of the step 1278, the second performance monitoring agent 32b becomes a new representative monitoring agent. On the other hand, the first performance monitoring agent 32a is no longer a representative monitoring agent. In other words, after the execution of the step 1278, the second performance monitoring agent 32b periodically obtains monitoring information from the monitoring information supply module 35 of the virtualization mechanism 30 to store the monitoring information in the shared storage module 56. On the other hand, only when a load of the second virtual computer 43b is judged to be high, the first performance monitoring agent 32a which is not a representative monitoring agent obtains monitoring information from the monitoring information supply module 35 of the virtualization mechanism 30 to store the monitoring information in the shared storage module 56.

FIG. 11B is a flowchart showing a process where the monitoring information management module 38b of the second performance monitoring agent 32b which is not a representative monitoring agent judges whether the load of the virtual computer 43a in which the representative monitoring agent operates is continuously high.

(1) The monitoring information management module 38b of the second performance monitoring agent 32b which is not a representative monitoring agent obtains a new record from the alternative condition table 2001 as a variable U1 (step 1300).

(2) The monitoring information management module 38b obtains information stored as a number of the alternative condition section 2001a of the variable U1 as a variable B1 (step 1301).

(3) The monitoring information management module 38b obtains a value which is a frequency denominator among conditions of the alternative condition section 2001a of the variable U1 as a variable B2, and a value which is a numerator as a variable B3 (step 1302).

(4) The monitoring information management module 38b sorts records based on the times section 2000a of the load judgment history table 2000. For example, the monitoring information management module 38b sorts the records of the load judgment history table 2000 to set times stored in the time section 2000a in descending order. The monitoring information management module 38b designates the number of records stored in the variable B2 to set times stored in the time section 2000a in descending order (step 1303).

(5) The monitoring information management module 38b obtains one of the records designated in the step 1303 as a variable A1 (step 1304).

(6) The monitoring information management module 38b adds 1 to a variable T when "Y" is stored in a section of a number matched with the variable B1 in the load judgment result section 2000b of the variable A1 (step 1305).

(7) The monitoring information management module 38b judges whether a next element of the variable A1 (i.e., record yet to be obtained as a variable A1) is present in the records designated in the step 1303 (step 1306). If a result of the judgment of the step 1306 shows that a next element is present, the process returns to the step 1304.

(8) If a result of the step 1306 shows that a next element is not present, the monitoring information management module 38b compares contents of the variables T and B3 with each other to judge whether the variable T is larger (step 1307). In this case, whether a frequency where a load exceeds a threshold value exceeds a frequency set in the alternative condition table 2001 is judged.

(9) If a result of the judgment of the step 1307 shows that the variable T is larger than the variable B3, the monitoring information management module 38b judges that a load is continuously high (step 1308).

(10) If a result of the judgment of the step 1307 shows that the variable T is not larger than the variable B3, the monitoring information management module 38b judges whether a next element of the variable U1 is present in the records designated in the step 1300 (i.e., whether a record yet to be obtained as a variable U1 is present in the records designated in the step 1300) (step 1309).

(11) If a result of the judgment of the step 1309 shows that a next element is present, the process returns to the step 1300.

(12) If a result of the judgment of the step 1309 shows that a next element is not present, the monitoring information management module 38b judges that the load is not continuously high (step 1310).

FIG. 11C is a flowchart showing a process where the performance monitoring manager 48 of the fifth embodiment of this invention decides a new representative monitoring agent.

It should be noted that in this case, the first performance monitoring agent 32a is a current representative monitoring agent while the second performance monitoring agent 32b is not a current representative monitoring agent.

(1) First, the agent management module 58 of the performance monitoring manager 48 receives a representative monitoring agent replacement request message containing a representative monitoring agent candidate list from the second performance monitoring agent 32b via the transmission/reception module 57 (step 1200).

(2) Next, the agent management module 58 of the performance monitoring manager 48 extracts the representative monitoring agent candidate list from the received representative monitoring agent replacement request message, and obtains the extracted representative monitoring agent candidate list as a variable/(step 1201).

(3) Then, the agent management module 58 takes out one element from the variable/to store the taken-out element as a variable J (step 1202).

In this case, for example, the variable J contains one performance monitoring agent identifier.

(4) Then, the agent management module 58 transmits a representative monitoring agent request message to the performance monitoring agent 32 identified by the variable J (step 1204). In this case, the representative monitoring agent request message is a message for checking whether the performance monitoring agent 32 identified by the variable J can be a representative monitoring agent. An example where the performance monitoring agent 32 identified by the variable J is a performance monitoring agent 32b will be described below.

The monitoring information management module 38b of the performance monitoring agent 32b that has received the representative monitoring agent request message judges whether the performance monitoring agent 32b can be a representative monitoring agent. This judgment may be executed based on, for example, current performance of the second virtual computer 43b. For example, if a current load of the second virtual computer 43b is not higher than a predetermined threshold value, it may be judged that the performance monitoring agent 32b can be a representative monitoring agent. Judgment as to whether the load is high may be executed by loading the monitoring information storage module 40b to judge whether the judgment conditions of the threshold value table 703 shown in FIG. 8 are satisfied.

The performance monitoring agent 32b transmits a result of the judgment as to whether it can be a representative monitoring agent to the performance monitoring manager 48 by containing it in a response message to the representative monitoring agent request message. For example, the response message contains information indicating "YES" if the performance monitoring agent 32b can be representative monitoring agent, or information indicating "NO" if it cannot be a representative monitoring agent.

(5) The performance monitoring manager 48 receives the response message of the step 1204 from the performance monitoring agent identified by the variable J (step 1206).

(6) The agent management module 58 of the performance monitoring manager 48 analyzes contents of the received response message to judge whether the contents are YES (step 1208).

(7) If a result of the judgment of the step 1208 shows YES, the agent management module 58 transmits a representative monitoring agent replacement message containing a variable J (i.e., identifier of the second performance monitoring agent 32b) to the performance monitoring agent 32 under control of the performance monitoring manager 48 (step 1210) to finish the process.

In this case, the representative monitoring agent is replaced by the performance monitoring agent identified by the variable J.

(8) If a result of the judgment of the step 1204 shows "NO", the performance monitoring agent identified by the variable J cannot be a new representative monitoring agent. In this case, the agent management module 58 judges whether a next element is present in the representative monitoring agent candidate list (i.e., whether an element yet to be processed as a variable J is present) (step 1212).

(9) If a result of the judgment of the step 1212 shows that a next element is present, the agent management module 58 takes out the next element as a new variable J to return to the step 1202.

(10) If a result of the judgment of the step 1212 shows that a next element is not present, no performance monitoring agent 32 can be a new representative monitoring agent. In this case, the performance monitoring manager 48 transmits a message indicating inhibition of replacing the representative monitoring agent to the performance monitoring agent 32 under control thereof (step 1214) to finish the process.

The fifth embodiment of this invention has been described by way of an example where the monitoring target computer 50, the monitoring manager computer 51, and the operation management terminal 52 are independent computers interconnected through the network. However, the fifth embodiment of this invention is not limited to this configuration. In other words, for example, the operation management terminal 52 may be a computer identical to the monitoring manager computer 51 or the monitoring target computer 50, or one of the virtual computers 43 disposed in the monitoring target computer 50. The monitoring manager computer 51 may be a computer identical to the monitoring target computer 50, or one of the virtual computers 43 disposed in the monitoring target computer 50.

As described above, there is a case where the representative monitoring agent cannot continuously obtain monitoring information of the virtualization mechanism 30 and cannot store the monitoring information in the shared storage module 56 because of the high load of the virtual computer 43. In such a case, according to the fifth embodiment of this invention, the representative monitoring agent can be replaced.

According to the fourth embodiment of this invention, when the load of the virtual computer 43 in which the representative monitoring agent operates is judged to be high, each performance monitoring agent 32 stores the monitoring information in the shared storage module 56. Then, when the load of the virtual computer 43 in which the representative monitoring agent operates is continuously high, each performance monitoring agent 32 stores the monitoring information. Thus, a possibility of storing overlapped data is high. According to the fifth embodiment of this invention, by replacing the representative monitoring agent where a load of the virtual computer is high, the amount of overlapped data can be further reduced.

Next, a sixth embodiment of this invention will be described.

Figure 12:
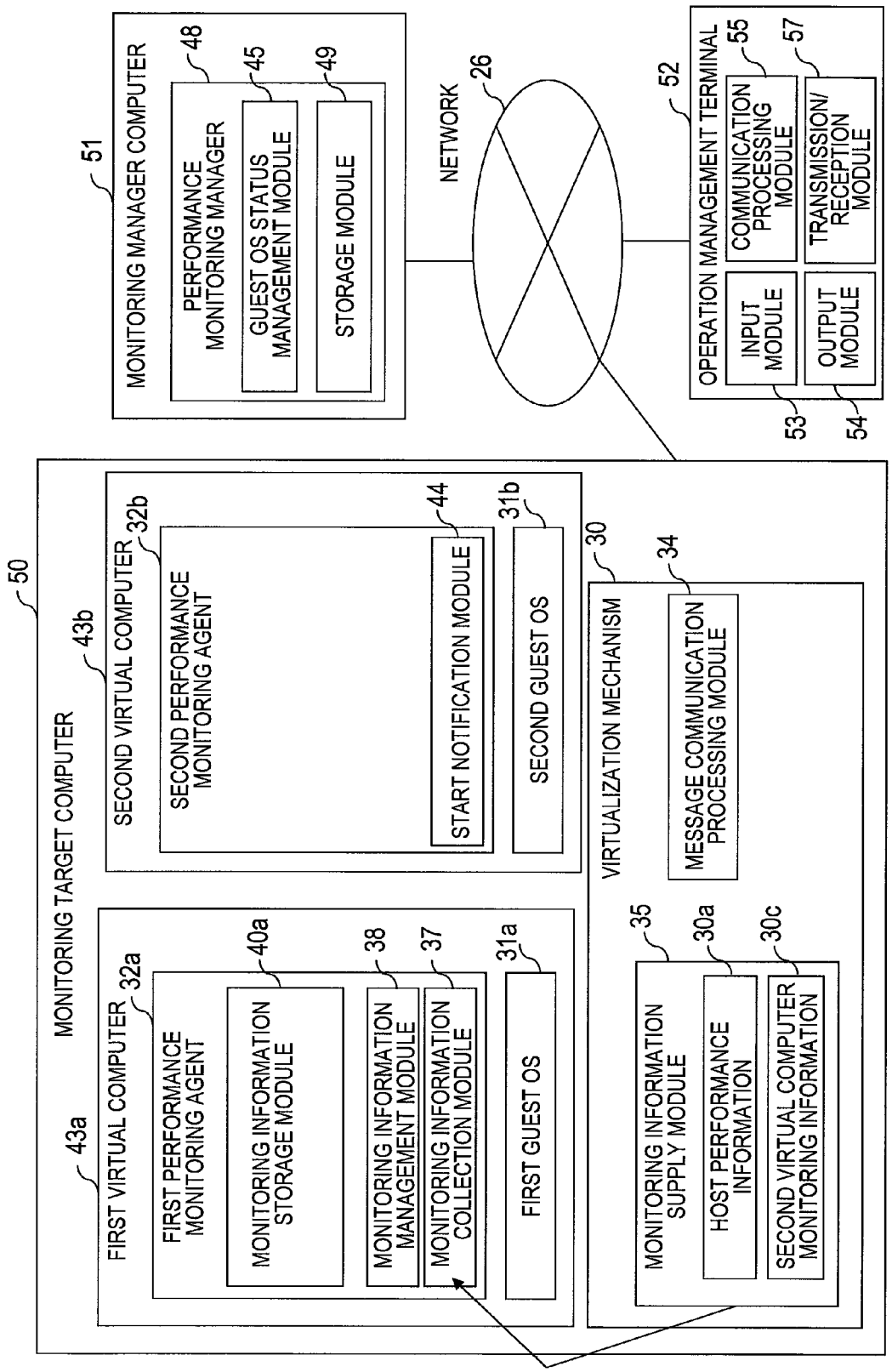
FIG. 12 is a functional block diagram showing a configuration of an information processing system according to a sixth embodiment of this invention.

FIG. 12 is a functional block diagram showing a configuration of an information processing system according to the sixth embodiment of this invention.

Description of components of the information processing system of the sixth embodiment of this invention which are similar to those of the first embodiment of this invention will be omitted, and differences will mainly be described.

A virtualization mechanism 30 includes a message communication processing module 34 and a monitoring information supply module 35. On the virtualization mechanism 30, first and second virtual computers 43a and 43b are operated.

A first guest OS 31a operates in the first virtual computer 43a, and a second guest OS 31b operates in the second virtual computer 43b.

A first performance monitoring agent 32a operates on the first guest OS 31a.

The first performance monitoring agent 32a is a program for monitoring monitoring information (i.e., second virtual computer monitoring information 30c) of the second virtual computer 43b to detect a starting failure of the second guest OS. The first performance monitoring agent 32a includes a monitoring information collection module 37 and a monitoring information management module 38.

The monitoring information management module 38 analyzes contents of pieces of monitoring information collected by the monitoring information collection module 37 to judge a load pattern of the second virtual computer 43b. For example, the monitoring information management module 38 stores normal load pattern information of the starting time of the second guest OS 31b. When the load pattern obtained from the monitoring information does not match conditions of the stored load pattern information, a starting failure can be judged.

The second performance monitoring agent 32b is operated on the second guest OS 31b. It is presumed that the second guest OS 31b is yet to be started.

The second performance monitoring agent 32b is a performance monitoring agent operated on the second guest OS 31b, and includes a start notification module 44.

The start notification module 44 executes a process of notifying a start of the second performance monitoring agent 32b to the performance monitoring manager 48. For example, at the last stage of the process of starting the second performance monitoring agent 32b, the start notification module 44 may transmit a start notification to the performance monitoring manager 48. An operator can decide a transmission destination of the start notification and set the transmission destination in the performance monitoring agent 32 beforehand. Specifically, the operator inputs information for identifying the transmission destination of the start notification by using an input module 53 of an operation management terminal 52. The input information is set in the performance monitoring agent 32 via the performance monitoring manager 48.

The monitoring information supply module 35 includes virtual computer configuration information regarding the first and second virtual computers 43a and 43b. The virtual computer configuration information is contained in first virtual computer monitoring information 30b and second virtual computer monitoring information 30c stored for each virtual computer.

The virtual computer configuration information contained in the first virtual computer monitoring information 30b holds, for example, a virtual power supply status of the first virtual computer 43a. Similarly, the virtual computer configuration information contained in the second virtual computer monitoring information 30c holds, for example, a virtual power supply status of the second virtual computer 43b. The virtual power supply status is information indicating, for example, which of a start status, a stop status, and a suspend status the virtual computer 43 is in.

The performance monitoring manager 48 operates in a monitoring manager computer 51 connected to the monitoring target computer 50 via a network 26.

The performance monitoring manager 48 includes a guest OS status management module 45 and a storage module 49.

The guest OS status management module 45 is a program module for managing a status of the guest OS 31.

The storage module 49 includes a virtual computer guest OS correspondence table storage area (not shown), a performance monitoring agent guest OS correspondence table storage area (not shown), and a guest OS status management table storage area (not shown). For example, those are storage areas of a memory 22 of a computer 20 for realizing the monitoring manager computer 51 or an external storage system 25.

In the guest OS status management table storage area, a guest OS status management table (not shown) including information regarding the guest OS's 31a and 31b managed by the guest OS status management module 45 is stored.

For example, the guest OS status management table includes a host name section (not shown) and a status section (not shown).

In the host name section, a host name is stored as an identifier of the guest OS 31.

In the status section, a status of the guest OS 31 identified by the identifier stored in the host name section is stored. The status is, for example, "START STATUS", "STARTING", "STOP STATUS", "STOPPING", "SUSPEND STATUS", or "SUSPENDING". When starting fails, "START FAILURE" is stored.

Figure 13A:
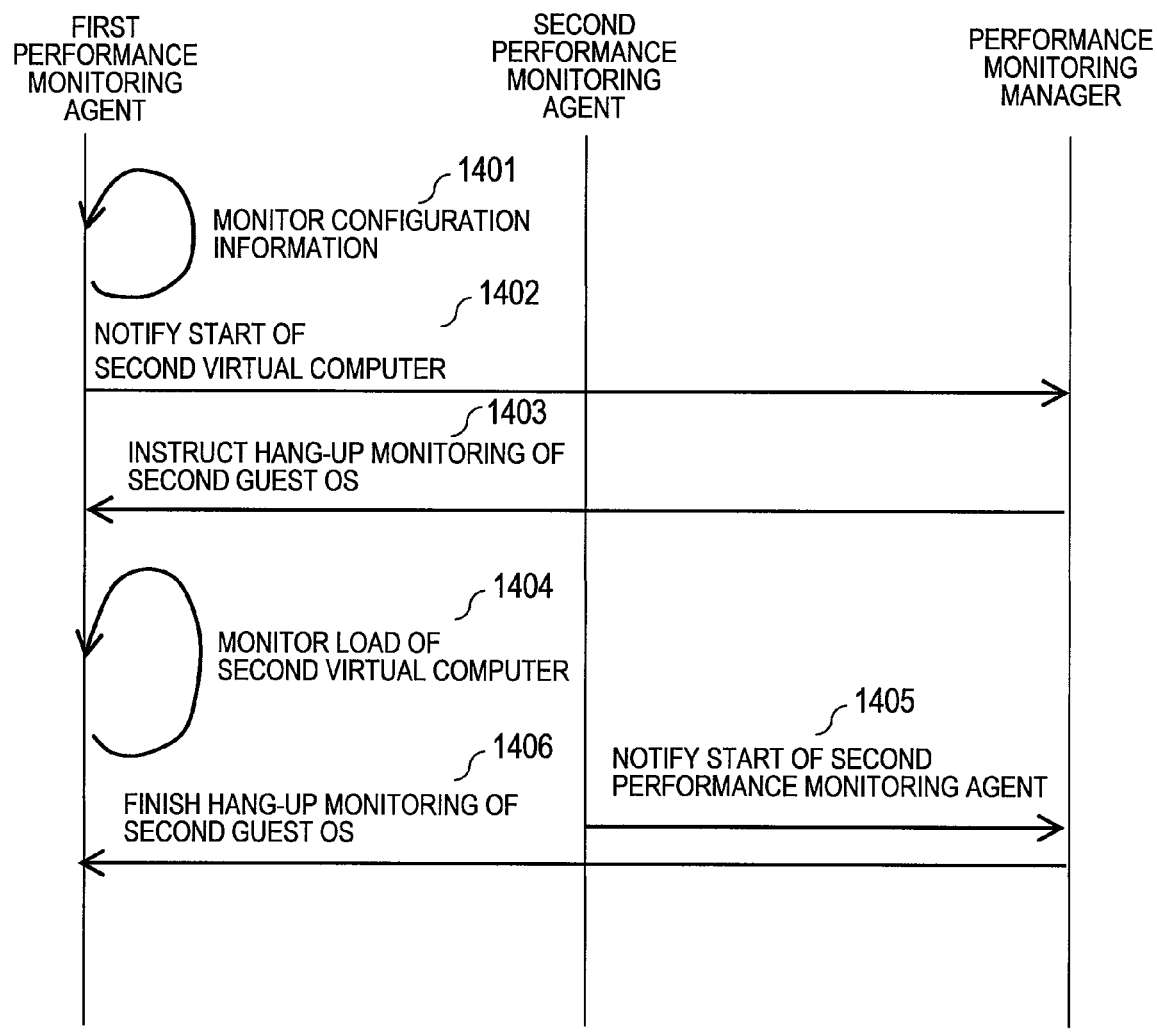
FIGS. 13A and 13B are sequence diagrams showing processes, in which the first performance monitoring agent monitors starting failures of a second guest OS according to the sixth embodiment of this invention.
Figure 13B:
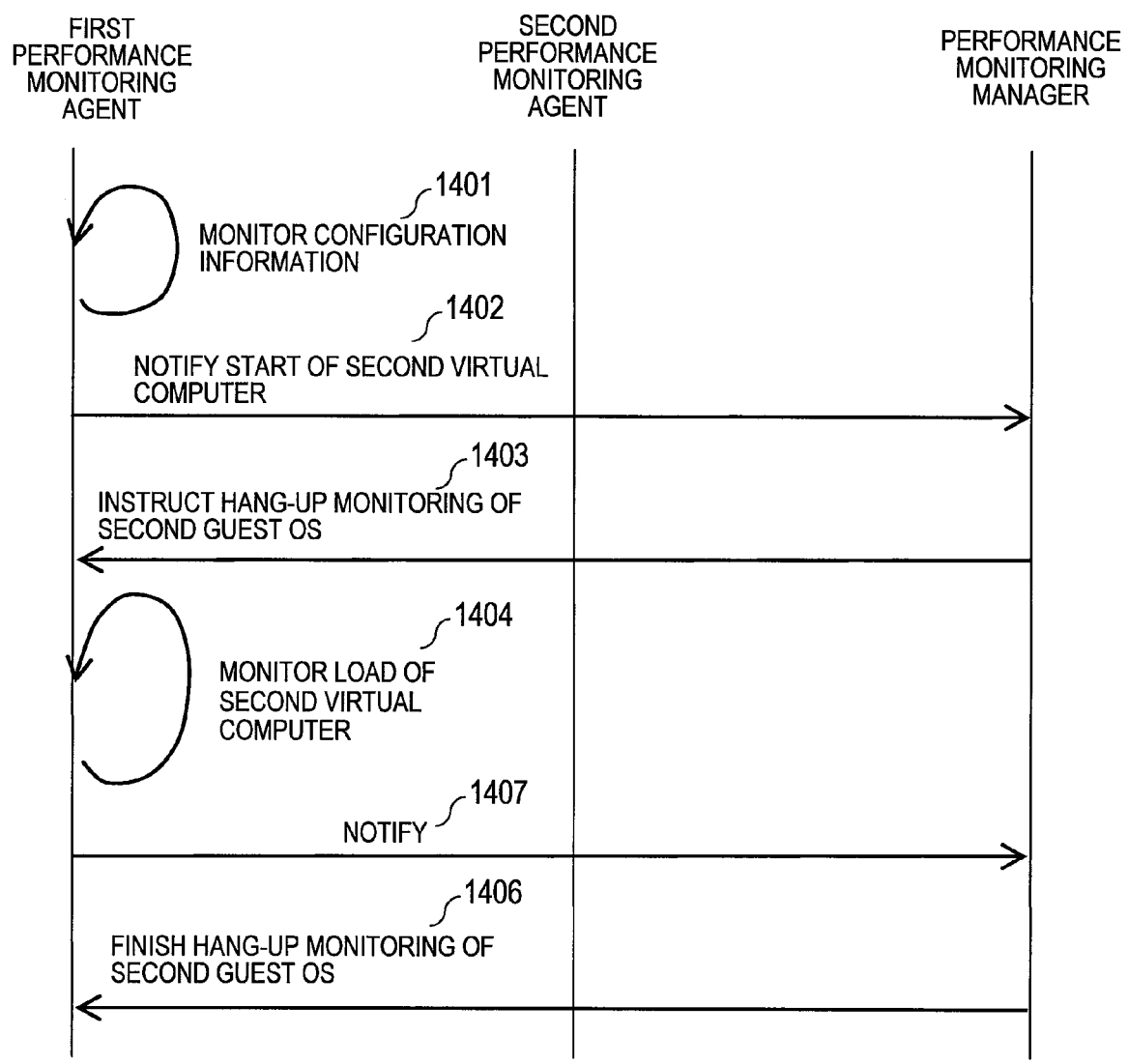

FIGS. 13A and 13B are sequence diagrams showing processes, in which the first performance monitoring agent 32a monitors starting failures of the second guest OS 31b according to the sixth embodiment of this invention. Those processes will be described next.

FIG. 13A is a sequence diagram when starting of the second guest OS 31b succeeds, and FIG. 13B is a sequence diagram when starting of the second guest OS 31b fails.

(1) The monitoring information collection module 37 of the first performance monitoring agent 32a periodically collects pieces of configuration information (specifically, power supply status of the second virtual computer 43b) from the monitoring information supply module 35. The monitoring information management module 38 judges whether the second virtual computer 43b has started based on the collected pieces of information (step 1401).

For example, if the power supply status of the second virtual computer 43b changes from a stop status to a start status, the monitoring information management module 38 of the first performance monitoring agent 32a can judge that the second virtual computer 43b has started. On the other hand, if the power supply status of the second virtual computer is still in the stop status, the monitoring information management module 38 of the first performance monitoring agent 32a can judge that the second virtual computer 43b is yet to be started. The change of the power supply status can be judged by comparing, for example, power supply status information contained in the pieces of configuration information collected by the monitoring information collection module 37a with power supply status information contained in pieces of configuration information collected last time, which are stored in the monitoring information storage module 40a.

If the monitoring information management module 38 detects a change from a suspend status to a start status rather than a change from a stop status to the start status regarding the power supply status of the second virtual computer 43b, a recovery process failure from a suspend status can be detected.

(2) If it is judged in the step 1401 that the monitored second virtual computer 43b has started, the monitoring information management module 38 of the first performance monitoring agent 32a notifies the start of the second virtual computer 43b to the performance monitoring manager 48. Specifically, the monitoring information management module 38 transmits a virtual computer start detection message containing information regarding the virtual computer (i.e., second virtual computer 43b) whose start has been detected to the performance monitoring manager 48 (step 1402). The information regarding the virtual computer 43 whose start has been detected contains, for example, an identifier of the virtual computer 43 whose start has been detected.

(3) Upon reception of the virtual computer start detection message, the guest OS status management module 45 of the performance monitoring manager 48 stores the identifier of the virtual computer 43 (i.e., second virtual computer 43b) whose start has been detected as a variable I.

(4) The guest OS status management module 45 changes management information of the start status of the guest OS 31 corresponding to the variable I.

Specifically, the guest OS status management module 45 loads the storage module 49 to read a virtual computer guest OS correspondence table 702 and a guest OS status management table. Then, the guest OS status management module 45 searches the virtual computer guest OS correspondence table 702 to set a value of a host name section 702b of a record whose virtual computer name section 702a matches the variable/as a variable J. The guest OS status management module 45 further searches the guest OS status management table to store "STARTING" in a status section of a record whose host name section matches the variable J.

(5) Next, the guest OS status management module 45 transmits a start failure detection request message of the second OS 31b to the monitoring information management module 38a of the first performance monitoring agent 32a (step 1403).

The start failure detection request message contains information that designates a virtual computer 43 (i.e., second virtual computer 43b) which is a start failure detection target. The start failure detection request message is a message for requesting a process of detecting a starting failure of the designated virtual computer 43 to the performance monitoring agent 32 which has received the message.

(6) The monitoring information management module 38 of the first performance monitoring agent 32a receives the start failure detection request message. The monitoring information management module 38 extracts the information designating the virtual computer 43 of the starting failure detection target from the start failure detection request to store the information as a variable K. Specifically, the information designating the virtual computer 43 of the starting failure detection target is, for example, an identifier of the virtual computer 43 of the starting failure detection target. Description will be made hereinafter presuming that the second virtual computer 43b has been designated by the variable K.

(7) The first performance monitoring agent 32a periodically monitors monitoring information of the second virtual computer 43b to judge whether a load of the second virtual computer is high (step 1404).

In other words, the monitoring information collection module 37 of the first performance monitoring agent 32a periodically collects pieces of monitoring information regarding the second virtual computer 43b (i.e., second virtual computer monitoring information 30c) from the monitoring information supply module 35. The monitoring information management module 38 judges whether starting of the guest OS 31 has failed based on the pieces of monitoring information collected by the monitoring information collection module 37.

For example, if the collected second virtual computer monitoring information 30c shows a pattern different from that of monitoring information collected at the time of normal start of the second guest OS 31b, a starting failure of the second guest OS 31b is judged. Specifically, a starting failure of the second guest OS 31b is judged when the collected monitoring information shows a behavior not exhibited when the second guest OS 31b is normally started, such as when the second virtual computer 43b is set in a steady status while its load is high, or when a load of the second virtual computer 43b is maintained low immediately after starting start processing. Alternatively, when almost no I/O processing occurs immediately after the start processing even though I/O processing frequently occurs at a normal OS start time, it can be judged that the guest OS 31 has failed to start.

(8) After the start of the second performance monitoring agent 32b, the start notification module 44 of the second performance monitoring agent 32b transmits a start notification message to the guest OS status management module 45 of the performance monitoring manager 48 (step 1405).

The start notification message is a message for notifying the start of the second performance monitoring agent 32b. In the sixth embodiment of this invention, it is presumed that the transmission of the start notification message completes the starting of the guest OS.

(9) The guest OS status management module 45 of the performance monitoring manager 48 that has received the start notification message from the start notification module 44 of the second performance monitoring agent 32b loads the storage module 49 to read a performance monitoring agent guest OS correspondence table 701 and a guest OS status management table.

The guest OS status management module 45 searches the guest OS status management table to store "START STATUS" in a status section of a record whose host name section is stored with an identifier of the second performance monitoring agent 32b corresponding to the second virtual computer 43b.

Further, the guest OS status management module 45 transmits a starting failure detection end message to the monitoring information management module 38 of the first performance monitoring agent 32a (step 1406).

The starting failure detection end message is a message for requesting an end of guest OS starting failure monitoring. The starting failure detection end message contains information for designating a virtual computer (i.e., second virtual computer 32b) whose starting failure detection process is to be stopped.

(10) The monitoring information management module 38 of the first performance monitoring agent 32a receives the starting failure detection end message. Then, the monitoring information management module 38 extracts information for designating a virtual computer 43 whose starting failure detection process is to be stopped (specifically, e.g., identifier of the second virtual computer 43b) from the received starting failure detection end message, and stores the information as a variable K.

The monitoring information management module 38 finishes the monitoring process of detecting the starting failure of the second guest OS 31b corresponding to the variable K. Further, the monitoring information collection module 37 finishes the collection process for the starting failure detection process.

Subsequently, by referring to FIG. 13B, a process when a starting failure of the guest OS 31 is judged will be described. In FIG. 13B, processes of steps 1401 to 1404 are the same as those of FIG. 13A.

(11) If it is judged in the step 1404 that starting of the guest OS 31 has failed, the monitoring information management module 38 of the first performance monitoring agent 32a transmits a starting failure notification message containing information for designating a virtual computer 43 (i.e., second virtual computer 43b) that has failed to start, to the performance monitoring manager 48 (step 1407).

(12) The guest OS status management module 45 of the performance monitoring manager 48 that has received the starting failure notification message extracts the information designating the virtual computer 43 (specifically, e.g., identifier of the second virtual computer 43b) that has failed to start from the starting failure notification message, and stores the information as a variable L. Hereinafter, it is presumed that the virtual computer 43 stored as the variable L is a second virtual computer 43b.

(13) The guest OS status management module 45 next loads the storage module 49 to read a guest OS status management table. Then, the guest OS status management module 45 searches the guest OS status management table to store "START FAILURE" in a status section of a record whose host name section is stored with an identifier of the second performance monitoring agent 32b corresponding to the second virtual computer 43b.

(14) Next, the guest OS status management module 45 transmits a starting failure detection end message to the first performance monitoring agent 32a (step 1406).

The sixth embodiment of this invention is not limited to that described above.

According to the above embodiment, the virtual computers have been described as the first and second virtual computers 43a and 43b. However, one or three or more virtual computers 43 may be constructed in the same virtualization mechanism 30. In the virtual computers 43, guest OS's 31 are operated.

The performance monitoring agent 32 may be operated in any place as in the case of the first to third embodiments of this invention. In other words, the performance monitoring agent 32 may be operated on each guest OS 31, or in the virtualization mechanism 30 (host computer). Alternatively, the performance monitoring agent 32 may be operated in a computer physically independent of the monitoring target computer 50 in which the virtualization mechanism 30 is operated.

Similarly, the performance monitoring agent 32 that detects the starting failure may be operated in any place as in the case of the first to third embodiments of this invention. Further, the operator may use the operation management terminal 52 to designate a performance monitoring agent 32 which executes a starting failure detection process via the performance monitoring manager 48 beforehand.

However, even when the performance monitoring agent 32 operates in the computer physically independent of the monitoring target computer 50 in which the virtual mechanization 30 is operated, the performance monitoring agent 32 that detects a starting failure needs to obtain monitoring information from the monitoring information supply module 35. When the performance monitoring agent 32 that detects the starting failure of the guest OS 31 and the performance monitoring manager 48 are operated in the same computer, those may be identical application programs.

According to the above embodiment, the steps 1402 and 1403 are executed. However, those steps may not be executed. In other words, the first performance monitoring agent 32a may start the process of the step 1404 for the virtual computer 43 detected in the step 1401 without receiving any starting failure detection request message from the performance monitoring manager 48. Even when the steps 1402 and 1403 are executed, the first performance monitoring agent 32a may execute the step 1404 before reception of the starting failure detection request message in the step 1403.

Further, the performance monitoring agent 32 can output a starting failure of an agent to the output module of the operation management terminal 52. In this case, the following process is carried out.

(1) The operator transmits an agent status acquisition request message containing information that designates a guest OS 31 whose starting failure is to be detected via the input module 53 of the operation management terminal 52.

(2) The guest OS status management module 45 of the performance monitoring manager 48 that has received the agent status acquisition request message extracts the information designating the guest OS 31 to be detected from the received message to set the information as a variable I.

(3) The guest OS status management module 45 obtains an identifier of a performance monitoring agent 32 corresponding to the variable/(i.e., performance monitoring agent 32 operated on the guest OS 31 designated by the variable I) as a variable J. Then, the guest OS status management module 45 loads the storage module 49 to read the guest OS status management table. The guest OS status management module 45 searches the guest OS status management table to obtain contents stored in a status section of a record whose host name section is stored with a variable J as a variable K.

(4) The guest OS status management module 45 designates contents of the variable K as a status of the guest OS 31 to be detected, and transmits an agent status acquisition response message containing information indicating the designated status to the operation management terminal 52.

(5) Upon reception of the agent status acquisition response message, the communication processing module 55 of the operation management terminal 52 extracts the contents designated by the agent status acquisition response message to output the contents via the output module 54.

As described above, according to the sixth embodiment of this invention, even in a situation where no second performance monitoring agent 32b is operated on the second guest OS 31b, by using performance information obtained from the virtualization mechanism 30, a starting failure of the second guest OS 31b can be detected.

Generally, a starting failure of the OS is detected by waiting for a predetermined time after a ping command is executed a plurality of times, and checking that there is no ping response while waiting. According to the sixth embodiment of this invention, however, without waiting for a predetermined time, the starting failure of the guest OS 31 can be found. In other words, according to the sixth embodiment of this invention, the starting failure of the guest OS 31 can be found almost simultaneously with the occurrence of a starting failure. As a result, the starting failure of the guest OS 31 can be detected at an early stage.

In particular, the OS has conventionally been started before application system services are started, to build an application system. Recently, however, cases where the OS is started after the start of application system services by using a switching process from a standby system to an active system (cold standby or the like) or a scale-out process have increased. In such cases, a starting failure of the OS needs to be detected as early as possible, and the OS starting failure detection method of this embodiment is very effective.

Further, according to the sixth embodiment of this invention, because the starting failure of the OS can be detected only by a software process without using any special hardware configuration, low-cost implementation can be easily realized.

While the present invention has been described in detail and pictorially in the accompanying drawings, the present invention is not limited to such detail but covers various obvious modifications and equivalent arrangements, which fall within the purview of the appended claims.

What is claimed is:

1. A system comprising:
a monitoring target computer including a plurality of computer resources and configuring a plurality of virtual machines having virtual resources, and allocating the computer resources to the virtual machines; and
a monitoring computer configured to:
(A) acquire virtual usage values regarding the virtual resources and measured by OSs executed in the virtual machines, by communicating with programs executed in the virtual machines;
(B) acquire allocated resource amounts indicating amounts of the computer resources allocated to the each of the virtual machines, by communicating with the monitoring target computer; and
(C) calculate actual usage values based on the virtual usage values and the allocated resource amounts,
wherein the monitoring computer makes correspondences between the virtual usage values and the allocated resource amounts for the calculation in (C),
wherein the virtual machines have virtual network interfaces assigned MAC addresses, and the MAC addresses are allocated by the monitoring target computer,
wherein the monitoring computer acquires the virtual usage values with the MAC address by communicating with the programs executed in the virtual machines,
wherein the monitoring computer acquires the allocated resource amounts with the MAC address by communicating with the monitoring target computer, and
wherein the MAC addresses are used in the making of the correspondences.

2. A system according to claim 1,
wherein the actual usage values are used for knowing a certain part of the computer resources which are allocated to at least one of the virtual machines but not by a program in the at least one of the virtual machines.

3. A system according to claim 1,
wherein the computer resources are CPUs, and the virtual resources are virtual CPUs.

4. A monitoring computer for monitoring a monitoring target computer,
wherein the monitoring target computer including a plurality of computer resources and configuring a plurality of virtual machines having virtual resources, and allocating the computer resources to the virtual machines,
the monitoring computer comprising:
an interface; and
a CPU configured to:
(A) via the interface, acquire virtual usage values regarding the virtual resources and measured by OSs executed in the virtual machines, by communicating with programs executed in the virtual machines;
(B) via the interface, acquire allocated resource amounts indicating amounts of the computer resources allocated to the each of the virtual machines, by communicating with the monitoring target computer; and
(C) calculate actual usage values based on the virtual usage values and the allocated resource amounts,
wherein the CPU makes correspondences between the virtual usage values and the allocated resource amounts for the calculation in (C),
wherein the virtual machines have virtual network interfaces assigned MAC addresses, and the MAC addresses are allocated by the monitoring target computer,
wherein, via the interface, the CPU acquires the virtual usage values with the MAC address by communicating with the programs executed in the virtual machines,
wherein, via the interface, the CPU acquires the allocated resource amounts with the MAC address by communicating with the monitoring target computer, and
wherein the MAC addresses are used in the making of the correspondences.

5. A monitoring computer according to claim 4,
wherein the actual usage values are used for knowing a certain part of the computer resources which are allocated to at least one of the virtual machines but not by a program in the at least one of the virtual machines.

6. A monitoring computer according to claim 4,
wherein the computer resources are CPUs, and the virtual resources are virtual CPUs.

7. A method of monitoring computer for monitoring a monitoring target computer,
wherein the monitoring target computer including a plurality of computer resources and configuring a plurality of virtual machines having virtual resources, and allocating the computer resources to the virtual machines,
the method comprising a step of:
(A) acquiring virtual usage values regarding the virtual resources and measured by OSs executed in the virtual machines, by communicating with programs executed in the virtual machines;
(B) acquiring allocated resource amounts indicating amounts of the computer resources allocated to the each of the virtual machines, by communicating with the monitoring target computer; and
(C) calculating actual usage values based on the virtual usage values and the allocated resource amounts,
wherein the method further comprising a step of:
making correspondences between the virtual usage values and the allocated resource amounts for the calculation in (C),
wherein the virtual machines have virtual network interfaces assigned MAC addresses, and the MAC addresses are allocated by the monitoring target computer,
wherein monitoring computer acquires the virtual usage values with the MAC address by communicating with the programs executed in the virtual machines,
wherein monitoring computer acquires the allocated resource amounts with the MAC address by communicating with the monitoring target computer, and
wherein the MAC addresses are used in the making of the correspondences.

8. A system according to claim 7,
wherein the actual usage values are used for knowing a certain part of the computer resources which are allocated to at least one of the virtual machines but not by a program in the at least one of the virtual machines.

9. A system according to claim 7,
wherein the computer resources are CPUs, and the virtual resources are virtual CPUs.

* * * * *